(12) United States Patent
Murakami

(10) Patent No.: US 9,881,373 B2
(45) Date of Patent: Jan. 30, 2018

(54) IMAGE GENERATING APPARATUS AND IMAGE GENERATING METHOD

(71) Applicant: CANON KABUSHIKI KAISHA, Tokyo (JP)

(72) Inventor: Tomochika Murakami, Ichikawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/649,181

(22) PCT Filed: Nov. 28, 2013

(86) PCT No.: PCT/JP2013/082652
§ 371 (c)(1),
(2) Date: Jun. 2, 2015

(87) PCT Pub. No.: WO2014/088049
PCT Pub. Date: Jun. 12, 2014

(65) Prior Publication Data
US 2015/0324997 A1 Nov. 12, 2015

(30) Foreign Application Priority Data

Dec. 7, 2012 (JP) .................... 2012-268173
Aug. 12, 2013 (JP) .................... 2013-167437
(Continued)

(51) Int. Cl.
*G06T 7/00* (2017.01)
*H04N 5/232* (2006.01)
(Continued)

(52) U.S. Cl.
CPC .......... *G06T 7/0014* (2013.01); *G02B 21/365* (2013.01); *G06T 5/001* (2013.01);
(Continued)

(58) Field of Classification Search
CPC .......... G06T 7/0014; G06T 5/50; G06T 5/001; G06T 7/0085; G06T 7/0097; G06T 5/002;
(Continued)

(56) References Cited

U.S. PATENT DOCUMENTS 7,847,979 B2   12/2010   Ptucha et al. ............... 358/3.26
8,587,818 B2   11/2013   Imaizumi et al. ........... 358/1.18
(Continued)

FOREIGN PATENT DOCUMENTS

JP   2007-128009 A   5/2007
JP   2008-017303     1/2008
(Continued)

OTHER PUBLICATIONS

Kodama's "Efficient Reconstruction of All-in-Focus Images Through Shifted Pinholes from Multi-Focus Images for Dense Light Field Synthesis and Rendering," IEEE Transactions on Image Processing, vol. 22, No. 11, Nov. 2013.*

(Continued)

*Primary Examiner* — Mekonnen Dagnew
(74) *Attorney, Agent, or Firm* — Fitzpatrick, Cella, Harper & Scinto

(57) ABSTRACT

An image generating apparatus generates an edge image that is an image for which an edge has been enhanced or extracted from an original image obtained by imaging a subject. The image generating apparatus has a viewpoint image generating unit configured to generate a viewpoint image from the original image; and an edge processing unit configured to generate the edge image by applying edge processing to enhance or extract an edge with respect to the viewpoint image generated by the viewpoint image generating unit.

16 Claims, 31 Drawing Sheets

(30) Foreign Application Priority Data

Sep. 11, 2013 (JP) .................................. 2013-188641
Sep. 30, 2013 (JP) .................................. 2013-204636

(51) Int. Cl.
- *G06T 5/00* (2006.01)
- *G02B 21/36* (2006.01)
- *G06T 5/50* (2006.01)

(52) U.S. Cl.
CPC ............... *G06T 5/002* (2013.01); *G06T 5/50* (2013.01); *H04N 5/23229* (2013.01); *G06T 2200/21* (2013.01); *G06T 2207/10004* (2013.01); *G06T 2207/10056* (2013.01); *G06T 2207/10148* (2013.01); *G06T 2207/20221* (2013.01); *G06T 2207/30024* (2013.01); *G06T 2207/30056* (2013.01)

(58) Field of Classification Search
CPC . G06T 2207/30056; G06T 2207/30024; G06T 2207/20221; G06T 2200/21; G06T 2207/10056; G02B 21/365; H04N 5/23229

See application file for complete search history.

(56) References Cited

U.S. PATENT DOCUMENTS

| | | | |
|---|---|---|---|
| 2006/0171582 A1 | 8/2006 | Eichhorn | |
| 2009/0046943 A1* | 2/2009 | Ishiga | G06T 5/10 382/266 |
| 2009/0190852 A1* | 7/2009 | Lim | G06T 15/205 382/256 |
| 2011/0273543 A1* | 11/2011 | Ushio | G02B 27/0172 348/54 |
| 2012/0287308 A1* | 11/2012 | Kojima | H04N 5/772 348/239 |

FOREIGN PATENT DOCUMENTS

| | | |
|---|---|---|
| JP | 2009-543458 | 12/2009 |
| JP | 2011-055467 | 3/2011 |
| JP | 2011-065339 | 3/2011 |
| WO | 03/045244 A2 | 6/2003 |

OTHER PUBLICATIONS

Marc Levoy, et al., "Light Field Microscopy", ACM Transactions on Graphics, vol. 25, pp. 924-934, Jan. 2006.

Namiko Torizawa, et al., "Using Multi-imaging Technique for Cell Membrane Extraction in Hepatic Histologic Images", IEICE General Conference, D-16-9, p. 259, 2009.

Kazuya Kodama, et al., "Scene Refocusing by Linear Combination in the Frequency Domain" Image Media Processing Symposium (IMPS 2012), I-3.02, pp. 45-46, Oct. 2012.

Kazuya Kodama, "Efficient Reconstruction of All-in-Focus Images Through Shifted Pinholes from Multi-Focus Images for Dense Light Field Synthesis and Rendering", IEEE Trans, Image Processing, vol. 22, Issue 11, pp. 4407-4421, Nov. 2013.

Kazuya Kodama, et al., "Virtual Bokeh Reconstruction from a Single System of Lenses", The Journal of The Institute of Image Information and Television Engineers, vol. 65 (3), pp. 372-381, Mar. 2011.

PCT Preliminary Report on Patentability dated Jun. 18, 2015 in corresponding No. PCT/JP2013/082652.

Japanese Office Action dated Nov. 21, 2017 in counterpart Japanese Application No. 2013-188641 with machine-generated English translation.

\* cited by examiner

FIG.11A
FIG.11B
FIG.11C
FIG.11D
FIG.11E
FIG.11F
FIG.11G
FIG.11H

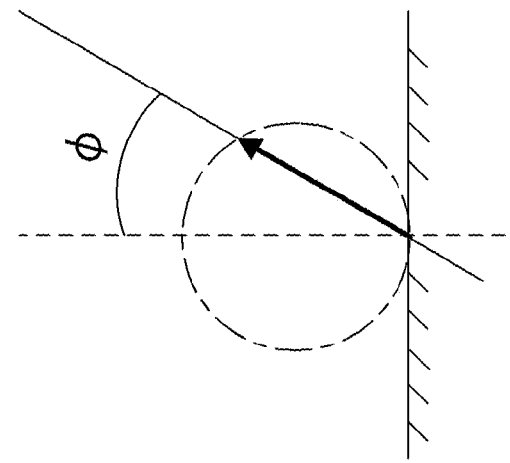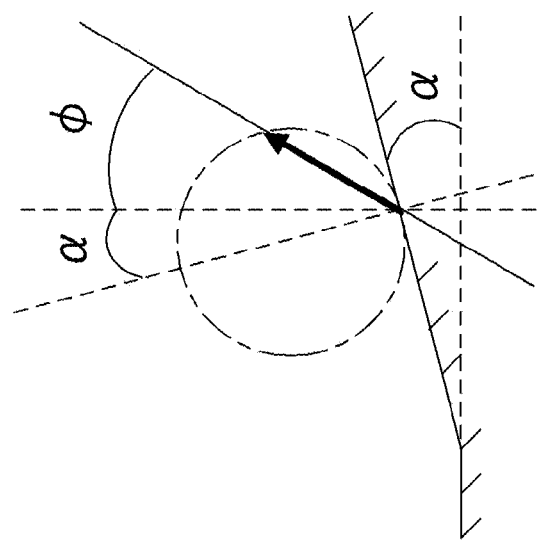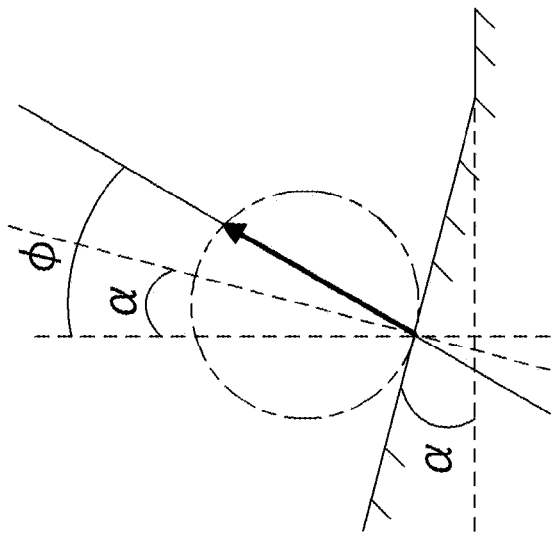

IMAGE GENERATING APPARATUS AND IMAGE GENERATING METHOD

TECHNICAL FIELD

The present invention relates to an image generating apparatus and an image generating method for generating an image suitable for observation from an image obtained by imaging a subject.

BACKGROUND ART

In the field of pathology, there are virtual slide systems which capture and digitize an image of a test sample placed on a prepared slide to enable pathological diagnosis on a display as an alternative to optical microscopes that are pathological diagnostic tools. Digitization of a pathological diagnostic image by a virtual slide system enables a conventional optical microscopic image of a test sample to be handled as digital data. As a result, advantages such as expediting of remote diagnosis, explanation to patients using digital images, sharing of rare cases, and improved efficiency in teaching and learning can be achieved.

In addition, since a wide variety of image processing can be performed on digital data, various diagnosis supporting functions for supporting diagnosis performed by pathologists are being proposed with respect to images captured by virtual slide systems.

Conventionally, the following proposals have been made as examples of diagnosis supporting functions.

Non-Patent Literature 1 discloses a method of extracting cell membrane from a pathologic tissue sample image of a liver using digital image processing technology with an objective to calculate an N/C ratio (a ratio occupied by a nucleus relative to cytoplasm) which is an important finding for diagnosing cancer. In Non-Patent Literature 1, color information of three types of observation images, namely, a bright field observation image, a dark field observation image, and a phase difference observation image is combined to improve a correct extraction rate of cell membrane as compared to using only a bright-field observation image.

In addition, besides a cell membrane, clarifying a cell boundary (in addition to a cell membrane, an intercellular substance (interstice) exists on a cell boundary between cells) and a boundary between a cell and a tube or a cavity is very important when performing diagnoses. Since a clear boundary enables a doctor to more easily estimate a complicated three-dimensional structure of a liver from a sample, a more accurate diagnosis can be achieved from limited information.

Furthermore, the boundary between a cell and a tube or a cavity is also information that is useful for accurately calculating an N/C ratio. For example, since a pathologic tissue sample of a liver may be roughly divided into a region of a cell including a nucleus and cytoplasm and a region of sinusoids that are blood vessels for supplying substances to hepatocyte, the sinusoid region in which a cell does not exist must be correctly eliminated in order to calculate a correct N/C ratio.

CITATION LIST

Patent Literature

[Patent Literature 1] Japanese Patent Application Laid-open No. 2007-128009

Non Patent Literature

[Non-Patent Literature 1] Namiko Torizawa, Masanobu Takahashi, and Masayuki Nakano, "Using Multi-imaging Technique for Cell Membrane Extraction in Hepatic Histologic Images", IEICE General Conference, D-16-9, 2009/3

[Non-Patent Literature 2] Kazuya Kodama, Akira Kubota, "Virtual Bokeh Reconstruction from a Single System of Lenses", The Journal of The Institute of Image Information and Television Engineers 65 (3), pp. 372-381, March 2011

[Non-Patent Literature 3] Kazuya Kodama, Akira Kubota, "Scene Refocusing by Linear Combination in the Frequency Domain", Image Media Processing Symposium (IMPS 2012), 1-3.02, pp. 45-46, October 2012

[Non-Patent Literature 4] Kazuya KODAMA, Akira KUBOTA, "Efficient Reconstruction of All-in-Focus Images Through Shifted Pinholes from Multi-Focus Images for Dense Light Field Synthesis and Rendering, IEEE Trans. Image Processing, Vol. 22, Issue 11, 15 pages (2013-11)

SUMMARY OF INVENTION

However, the conventional art described above has the following problems.

In Non-Patent Literature 1, in order to acquire a bright field observation image, a dark field observation image, and a phase difference observation image, a phase difference objective lens and a common capacitor are mounted on a bright-field microscope and photography is performed by switching between the phase difference objective lens and the common capacitor. Therefore, there is a cost-related issue in that an optical microscope for bright-field observation requires additional parts and an issue of inconvenience in that photography requires optical systems and exposure conditions to be modified.

The present invention has been made in consideration of such problems, and an object thereof is to provide a novel technique for generating an image in which a boundary of a subject is clarified by image processing from an original image obtained by imaging the subject.

The present invention in its first aspect provides an image generating apparatus which generates an edge image that is an image for which an edge has been enhanced or extracted from an original image obtained by imaging a subject, the image generating apparatus comprising: a viewpoint image generating unit configured to generate a viewpoint image from the original image; and an edge processing unit configured to generate the edge image by applying edge processing to enhance or extract an edge with respect to the viewpoint image generated by the viewpoint image generating unit.

The present invention in its second aspect provides an image generating apparatus that generates a viewpoint image suitable for observation from an original image obtained by imaging a subject, the image generating apparatus comprising: a viewpoint determining unit configured to estimate a direction of an edge included in the original image by analyzing the original image, and to determine a viewpoint at which a viewpoint image is to be generated based on the estimated edge direction; and a viewpoint image generating unit configured to generate a viewpoint image from the original image with respect to the viewpoint determined by the viewpoint determining unit.

The present invention in its third aspect provides an image generating apparatus that generates a viewpoint image suitable for observation from an original image obtained by imaging a subject, the image generating apparatus comprising: a viewpoint determining unit configured to estimate a direction of an edge included in the original image by analyzing the original image, and to determine a plurality of viewpoints at which viewpoint images are to be generated, respectively, based on the estimated edge direction; a viewpoint image generating unit configured to generate a plurality of viewpoint images from the original image with respect to the plurality of viewpoints determined by the viewpoint determining unit; a selecting unit configured to cause a user to select two or more viewpoint images from the plurality of viewpoint images; and a compositing unit configured to composite the two or more viewpoint images selected by the user.

The present invention in its fourth aspect provides an image generating apparatus which generates an edge image that is an image for which an edge has been enhanced or extracted from an original image obtained by imaging a subject, the image generating apparatus comprising: a filter generating unit configured to generate a filter to perform edge enhancement or edge extraction in accordance with a line-of-sight direction with respect to the subject; and an edge processing unit configured to generate an edge image by using the original image and the filter.

The present invention in its fifth aspect provides an image generating method of generating an edge image that is an image for which an edge has been enhanced or extracted from an original image obtained by imaging a subject, the image generating method comprising the steps, executed by a computer, of: generating a viewpoint image from the original image; and generating an edge image by applying edge processing to enhance or extract an edge with respect to the generated viewpoint image.

The present invention in its sixth aspect provides an image generating method of generating a viewpoint image suitable for observation from an original image obtained by imaging a subject, the image generating method comprising the steps, executed by a computer, of: estimating a direction of an edge included in the original image by analyzing the original image and determining a viewpoint at which a viewpoint image is to be generated based on the estimated edge direction; and generating a viewpoint image from the original image with respect to the determined viewpoint.

The present invention in its seventh aspect provides an image generating method of generating a viewpoint image suitable for observation from an original image obtained by imaging a subject, the image generating method comprising the steps, executed by a computer, of: estimating a direction of an edge included in the original image by analyzing the original image and determining a plurality of viewpoints at which a viewpoint image is to be generated based on the estimated edge direction; generating a plurality of viewpoint images from the original image with respect to the plurality of determined viewpoints; causing a user to select two or more viewpoint images from the plurality of viewpoint images; and compositing the two or more viewpoint images selected by the user.

The present invention in its eighth aspect provides an image generating method of generating an edge image that is an image for which an edge has been enhanced or extracted from an original image obtained by imaging a subject, the image generating method comprising the steps, executed by a computer, of: generating a filter for performing edge enhancement or edge extraction in accordance with a line-of-sight direction with respect to the subject; and generating an edge image by using the original image and the filter.

The present invention in its ninth aspect provides a program that causes a computer to execute the respective steps of the image generating method according to the present invention.

According to the present invention, an image in which a boundary of a subject is clarified can be generated by image processing from an original image obtained by imaging the subject.

Further features of the present invention will become apparent from the following description of exemplary embodiments with reference to the attached drawings.

BRIEF DESCRIPTION OF DRAWINGS

FIGS. 11A to 11H are diagrams showing filters of a Prewitt template operator and edge detection directions;

FIGS. 22A to 22C are schematic views showing intensity of scattered light at an observation angle φ on various planes shown in FIG. 21;

DESCRIPTION OF EMBODIMENTS (Overall configuration)

Figure 1:
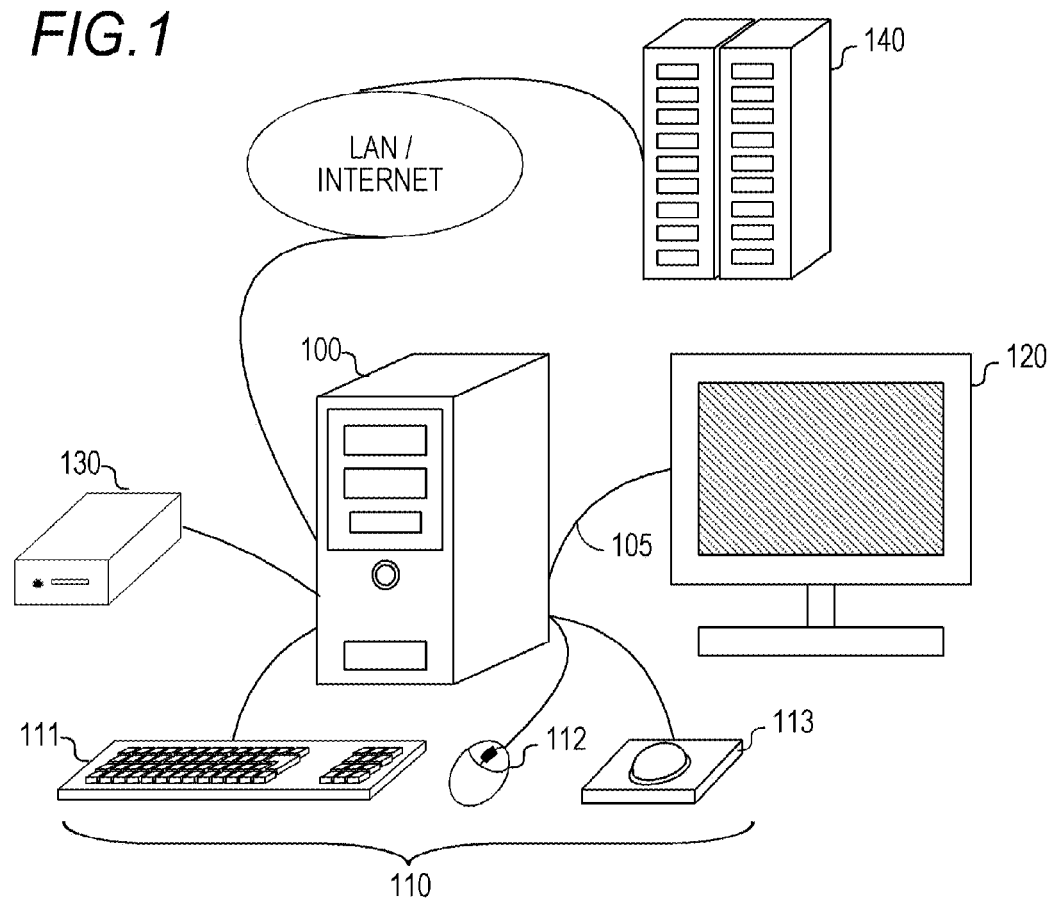
FIG. 1 is a configuration diagram of an image generation and display system according to an embodiment of the present invention.

FIG. 1 shows a configuration of an image generation and display system according to an embodiment of the present invention.

Connected to an image generating apparatus (a host computer) 100 are an input operation device 110 which accepts input from a user and a display 120 for presenting the user with images or the like outputted from the image generating apparatus 100. A keyboard 111, a mouse 112, a dedicated controller 113 (for example, a trackball or a touch pad) for improving operability of a user, and the like can be used as the input operation device 110. In addition, a storage device 130 such as a hard disk drive, an optical disk drive, or a flash memory and another computer system 140 that is accessible via a network I/F are connected to the image generating apparatus 100. Moreover, while FIG. 1 shows the storage device 130 existing outside of the image generating apparatus 100, the storage device 130 may alternatively be built into the image generating apparatus 100.

In accordance with a user's control signals inputted from the input operation device 110, the image generating apparatus 100 acquires image data from the storage device 130 and applies image processing to the image data to generate an observation image suitable for observation or to extract information necessary for diagnosis.

An image display application and an image generation program (both not shown) are computer programs that are executed by the image generating apparatus 100. These programs are stored in an internal storage device (not shown) inside the image generating apparatus 100 or in the storage device 130. Functions related to image generation (to be described later) are provided by the image generation program. The respective functions of the image generation program can be invoked (used) via the image display application. Processing results (for example, a generated observation image) of the image generation program are presented to the user via the image display application.

(Display screen)

Figure 2:
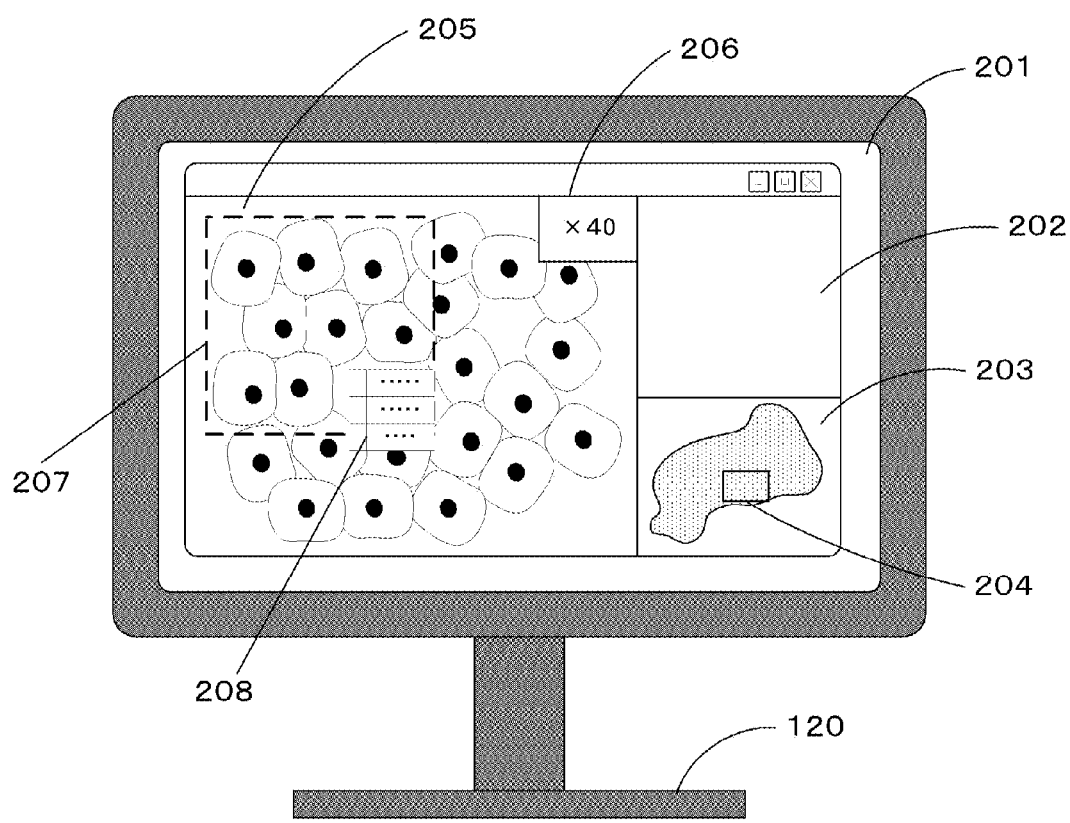
FIG. 2 shows a display example for explaining functions of an image display application.

FIG. 2 shows an example of displaying image data of a specimen imaged in advance on the display 120 via the image display application.

FIG. 2 presents a basic configuration of a screen layout of the image display application. Arranged within a full window 201 of a display screen are an information area 202 that shows a display status and an operation status as well as information on various images, a thumbnail image 203 of a specimen that is an observation object, a display region 205 for detailed observation of specimen image data, and a display magnification 206 of the display region 205. A frame line 204 rendered on the thumbnail image 203 indicates a position and a size of a region displayed in enlargement in the display region 205 for detailed observation. Based on the thumbnail image 203 and the frame line 204, the user can readily comprehend which portion is being observed among the entire specimen image data.

An image displayed in the display region 205 for detailed observation can be set and updated by a movement operation or an enlargement/reduction operation performed using the input operation device 110. For example, movement can be realized by a drag operation of the mouse on the screen and enlargement/reduction can be realized by a rotation of a mouse wheel (for example, a forward rotation of the wheel may be assigned to enlargement and a backward rotation of the wheel may be assigned to reduction). In addition, switching to an image with a different focusing position can be realized by pressing a prescribed key (for example, the Ctrl key) and rotating the mouse wheel or the like at the same time (for example, a forward rotation of the wheel may be assigned to a transition to a deeper image and a backward rotation of the wheel may be assigned to a transition to a shallower image). The display region 205, the display magnification 206, and the frame line 204 inside the thumbnail image 203 are updated in accordance with a modification operation on the displayed image which is performed by the user as described above. In this manner, the user can observe an image with a desired intra-plane position, depth position, and magnification.

(Image Generating Apparatus)

Figure 3:
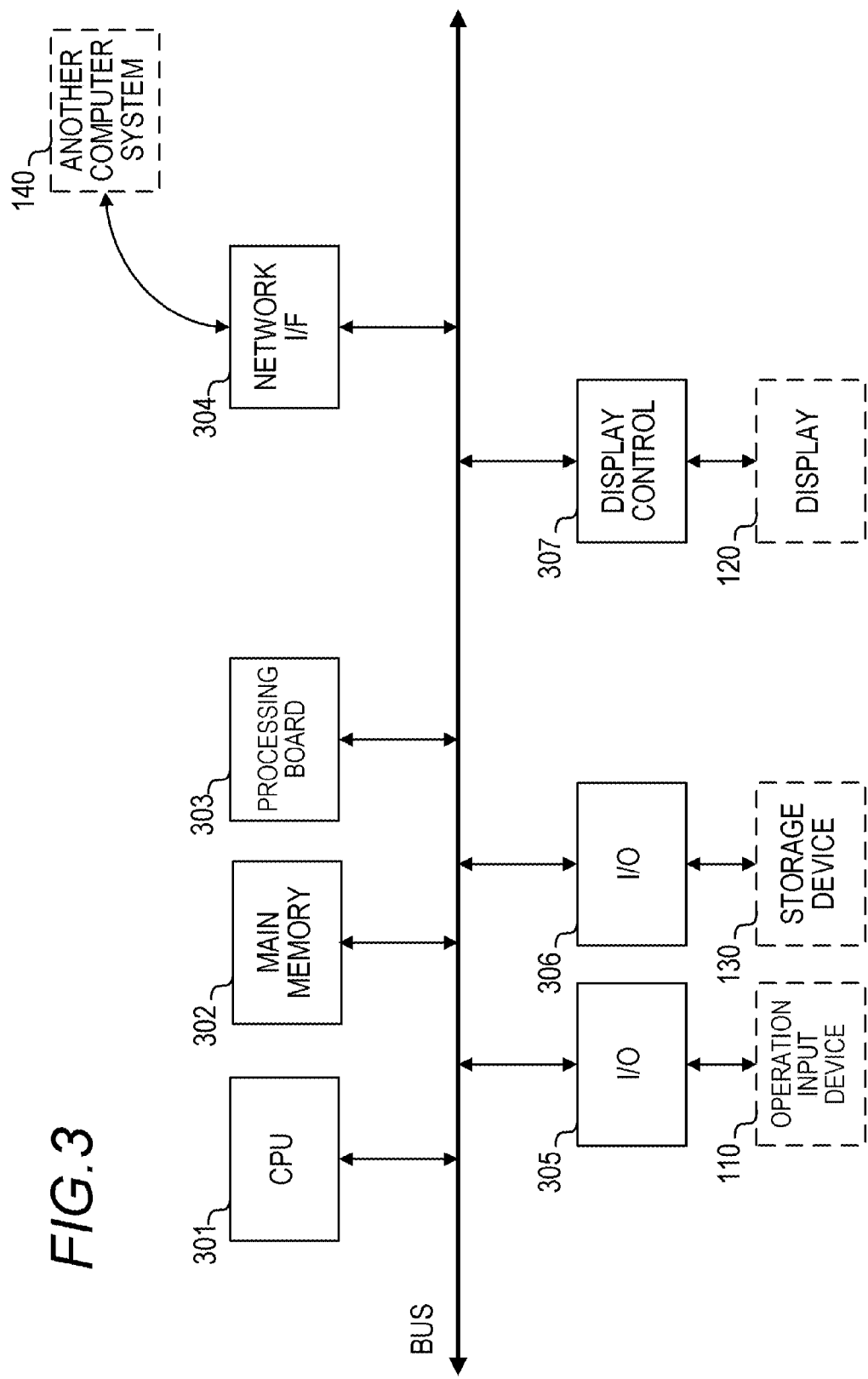
FIG. 3 is a diagram showing an internal configuration of an image generating apparatus.

FIG. 3 is a diagram showing an internal configuration of the image generating apparatus 100.

A CPU 301 controls the entire image generating apparatus using programs and data stored in a main memory 302. In addition, the CPU 301 performs various arithmetic processing and data processing such as discrete Fourier transform, filter processing, and viewpoint image synthesis processing which will be described in the examples below.

The main memory 302 includes an area for temporarily storing programs and data loaded from the storage device 130 and programs and data downloaded from the other computer system 140 via a network I/F (interface) 304. In addition, the main memory 302 includes a work area necessary for the CPU 301 to carry out various processing.

The input operation device 110 is constituted by a device capable of inputting various instructions to the CPU 301 such as the keyboard 102, the mouse 103, or the dedicated controller 113. The user uses the input operation device 110 to input information for controlling operations of the image generating apparatus 100. Reference numeral 305 denotes an I/O for notifying various instructions and the like inputted via the operation input device 110 to the CPU 301.

The storage device 130 is a large-capacity storage device such as a hard disk and stores an OS (operating system), programs and image data which enable the CPU 301 to execute processing described in the following examples, and the like. Writing of information into the storage device 130 and reading of information from the storage device 130 are performed via an I/O 306.

A display control apparatus 307 performs control processing to cause images, characters, and the like to be displayed on the display 120. The display 120 performs image display for prompting the user's input and displays images based on image data acquired from the storage device 130 or the other computer system 140 and processed by the CPU 301.

An arithmetic processing board 303 includes a processor in which specific arithmetic functions such as image processing have been enhanced and a buffer memory (not shown). While the following description assumes that the CPU 301 is used for various arithmetic processing and data processing and the main memory 302 is used as a memory region, a configuration using the processor and the buffer memory in the arithmetic processing board can also be adopted. Such a configuration also falls within the scope of the present invention.

(Subject)

Figure 4:
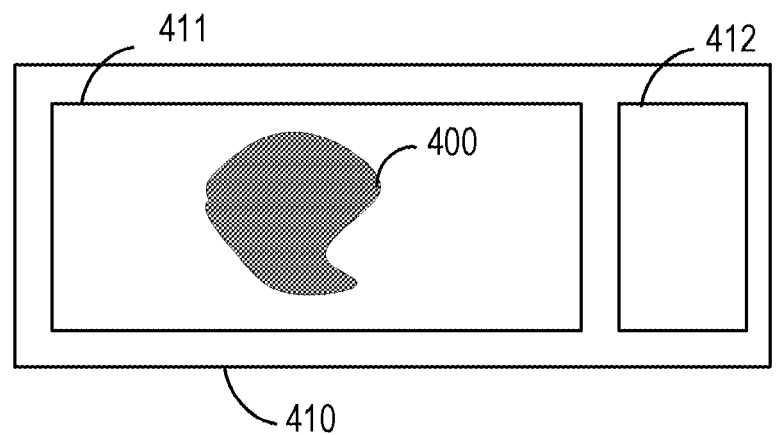
FIG. 4 is a diagram showing a prepared slide that is an example of a subject.

FIG. 4 represents a prepared slide (also referred to as a slide) of a pathological sample that is an example of a subject. With the prepared slide of the pathological sample, a specimen 400 placed on a slide glass 410 is sealed by an encapsulating agent (not shown) and a cover glass 411 to be placed on top of the encapsulating agent. A size and thickness of the specimen 400 differ for each specimen. Furthermore, a label area 412 that records information regarding the specimen is also provided on the slide glass 410. Information may be recorded in the label area 412 manually using a pen or by printing a barcode or a two-dimensional code. In addition, a storage medium capable of storing information by an electric method, a magnetic method, or an optical method may be provided in the label area 412. The following embodiment will be described using an example in which the prepared slide of the pathological sample shown in FIG. 4 is used as a subject.

(Image Pickup Apparatus)

Figure 5:
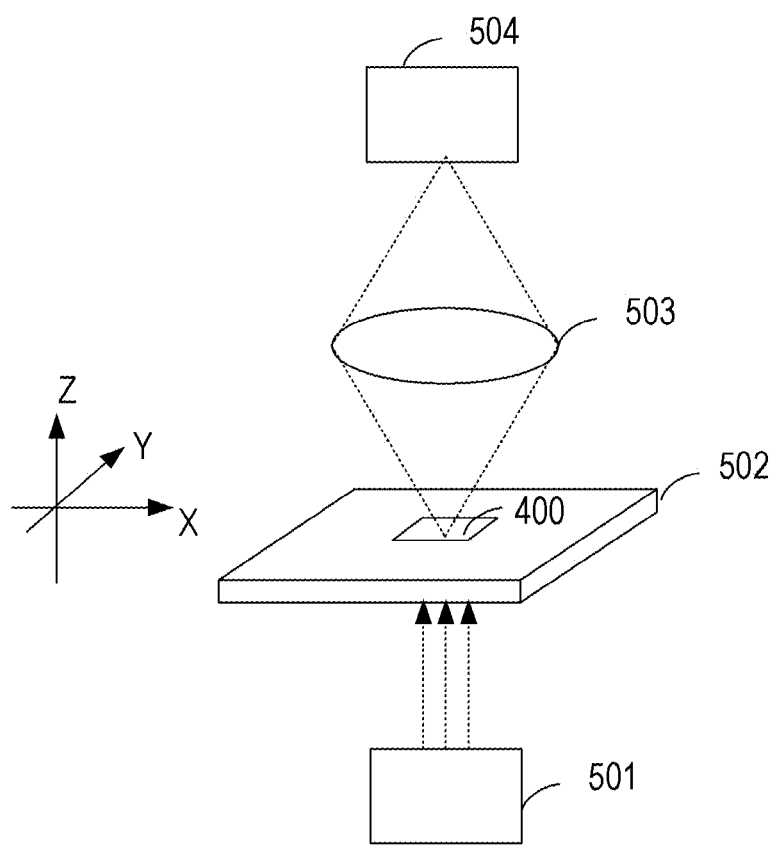
FIG. 5 is a diagram schematically showing a configuration of an image pickup apparatus for imaging a subject.

FIG. 5 schematically represents a part of a configuration of an image pickup apparatus which images the subject and acquires a digital image. As shown in FIG. 5, in the present embodiment, an x axis and a y axis are oriented parallel to a surface of the specimen 400 and a z axis is oriented in a depth direction of the specimen 400 (in an optical axis direction of an optical system).

A prepared slide (the specimen 400) is placed on a stage 502 and light is irradiated from an illuminating unit 501. Light transmitted through the specimen 400 is enlarged by an imaging optical system 503 and forms an image on a light-receiving surface of an image pickup sensor 504. The image pickup sensor 504 is a one-dimensional line sensor or a two-dimensional area sensor having a plurality of photoelectric conversion elements. An optical image of the specimen 400 is converted into an electric signal by the image pickup sensor 504 and outputted as digital data.

When an image of the entire specimen cannot be acquired in one shot, segmental image pickup is performed a plurality of times while moving the stage 502 in the x direction and/or the y direction and the plurality of obtained segmented images are composited (spliced) to generate an image of the entire specimen. In addition, by taking a plurality of shots while moving the stage 502 in the z direction, a plurality of images (referred to as layer images) with different focusing positions in the optical axis direction (a depth direction) are acquired. In the present description, a group of images made up of a plurality of layer images with different focusing positions in the optical axis direction (the depth direction) is referred to as a "Z stack image" or "Z stack image data". In addition, a layer image or a Z stack image acquired by imaging the subject will be referred to as an "original image".

A value of magnification that is displayed as the display magnification 206 shown in FIG. 2 is a product of a magnification of the imaging optical system 503 multiplied by an enlargement/reduction ratio on the image display application. Moreover, the magnification of the imaging optical system 503 may be fixed or varied by replacing objective lenses.

(Description of Techniques for Generating Viewpoint Image)

Instead of requiring an observation/image capturing method that modifies an optical system such as dark field observation and phase difference observation, the image generating apparatus 100 generates an intermediate image (a viewpoint image) from a Z stack image by image processing and generates an observation image suitable for observation and diagnosis using the intermediate image. First, techniques that can be used in processing for generating a viewpoint image as an intermediate image from a Z stack image will be described.

It is known that a viewpoint image observed from an arbitrary direction (an arbitrary viewpoint image) can be generated from a plurality of images (a Z stack image) imaged while varying focusing positions in the optical axis direction. In this case, a viewpoint image refers to an image that observes the subject from a prescribed observation direction (in other words, a viewpoint).

For example, Japanese Patent Application Laid-open No. 2007-128009 (hereinafter, referred to as Patent Literature 1) discloses a method of generating an image with an arbitrary viewpoint or an arbitrary blur from a group of out-of-focus blurred images imaged while varying focusing positions. This method involves performing coordinate transform processing on a group of out-of-focus blurred images so that a three dimensional out-of-focus blur remains unchanged at an XYZ position and applying three-dimensional filter processing in an obtained orthogonal coordinate system (XYZ) in order to obtain an image with a modified viewpoint or a modified blur.

In addition, Non-Patent Literature 2 discloses an improvement of the method disclosed in Patent Literature 1. According to Non-Patent Literature 2, an integrated image is generated by obtaining a line-of-sight direction from a viewpoint and integrating a Z stack image in the line-of-sight direction, and an integrated image of a three-dimensional blur in the line-of-sight direction is generated in a similar manner. Subsequently, by subjecting the three-dimensional blur integrated image to inverse filter processing with respect to the integrated image of the Z stack image, an effect of a Z direction constraint (the number of layer images) is suppressed and a high-quality viewpoint image can be generated.

Furthermore, Non-Patent Literature 3 discloses a method of speeding up the calculation performed in Non-Patent Literature 2. With the method according to Non-Patent Literature 3, an arbitrary viewpoint image or an arbitrary blur image on a frequency region can be efficiently calculated by a linear coupling of a filter determined in advance independent of a subject (scene) and a Fourier transform image of a group of out-of-focus blurred images at each Z position.

In the following description, methods of generating a viewpoint image observed from an arbitrary direction (an arbitrary viewpoint image) or generating an image having an arbitrary out-of-focus blur from a plurality of images (a Z stack image) taken while varying focusing positions in the optical axis direction will be collectively referred to as an MFI (multi-focus imaging) arbitrary viewpoint/out-of-focus blur image generating method.

Moreover, with a Z stack image taken while varying focusing positions using a microscope with a bilaterally telecentric optical system, a three-dimensional out-of-focus blur remains unchanged at an XYZ position. Therefore, when applying the MFI arbitrary viewpoint/out-of-focus blur image generating method to a Z stack image taken by a bilaterally telecentric optical system, coordinate transform processing and enlargement/reduction processing of an image that accompanies the coordinate transform processing need not be performed.

An image pickup apparatus is known which is capable of acquiring, by one imaging operation, an image on which is recorded four-dimensional information (information in which a degree of freedom of a viewpoint position is added to an XY two-dimensional image) that is referred to as a light field. Such an image pickup apparatus is referred to as a light field camera or a light field microscope. In such apparatuses, a lens array is disposed at an original position of an imaging plane and a light field is taken by an image sensor to the rear of the lens array. An image with an arbitrary focusing position or a viewpoint image observed from an arbitrary direction (an arbitrary viewpoint image) can also be generated using known techniques from an original image on which a light field is recorded.

In the present example, an image with an arbitrary observation direction that is generated by digital image processing from a captured image such as a Z stack image or a light field without physically changing a direction of the image pickup apparatus with respect to the subject will be referred to as a "viewpoint image". The viewpoint image is an image which simulates an image formed on an imaging plane by a luminous flux centered on a main light beam that is an arbitrary light beam passing through an imaging optical system used to image the subject. A direction of the main light beam corresponds to the observation direction. The direction of the main light beam can be arbitrarily set. A magnitude (NA) of the luminous flux can also be arbitrarily set. When the objective is to perform image diagnosis or the like, a depth of field of the viewpoint image is desirably deep. Therefore, NA of the luminous flux with respect to the viewpoint image is desirably equal to or less than 0.1.

A viewpoint image generated (calculated) by digital image processing is not necessarily consistent with an image photographed by physically changing exposure conditions (an aperture position and/or an aperture size), the optical axis direction, lenses, or the like of the imaging optical system. However, even if the viewpoint image is not consistent with an actually photographed image, as long as the viewpoint image has features similar to those produced when observing the subject while varying viewpoints (in other words, as long as effects similar to varying observation directions can be imparted by digital image processing), the viewpoint image is useful for image observation, image diagnosis, and the like. Therefore, an image which is not exactly consistent with an image actually photographed by changing observation directions and the like but which is subjected to digital image processing so that features similar to an actually photographed image appear is also included in viewpoint images according to the present example.

According to Patent Literature 1, a viewpoint image observed through a pinhole at a position shifted by a viewpoint $(x, y, z)=(s, t, 0)$ from an origin O $(x, y, z)=(0, 0, 0)$ on a lens plane in a real space (corresponding to a pupil plane) can be generated from a group of out-of-focus blurred images subjected to coordinate transform. With the MFI arbitrary viewpoint/out-of-focus blur image generating method, an observation direction from which the subject is observed or, in other words, a line-of-sight direction can be varied by changing a position of a viewpoint on the lens plane.

A line-of-sight direction can be defined as a gradient of a straight line that passes through a viewpoint position $(x, y, z)=(s, t, 0)$ on the lens plane among a luminous flux emitted from a prescribed position of the subject corresponding to a formed image. A line-of-sight direction can be expressed in various ways. For example, an expression by a three-dimensional vector representing a traveling direction of the straight line may be adopted. Alternatively, an expression by an angle (observation angle) formed between the three-dimensional vector and an optical axis and an angle (polar angle) formed between the vector when projected on a plane perpendicular to the optical axis and the X axis may be adopted.

When the imaging optical system is not bilaterally telecentric, a three-dimensional out-of-focus blur on the imaging plane varies depending on a spatial position (a position in the xyz coordinate) of the subject in focus and a gradient of the straight line that passes through the viewpoint position $(x, y, z)=(s, t, 0)$ on the lens plane is not constant. In this case, a line-of-sight direction is favorably defined on an orthogonal coordinate system (XYZ) after the coordinate transform described in Patent Literature 1, whereby a line-of-sight direction can be expressed by a vector $(X, Y, Z)=(-s, -t, 1)$. Hereinafter, a method of obtaining a line-of-sight direction after coordinate transform will be described.

Patent Literature 1 describes that all light beams connecting arbitrary positions where the imaging optical system is in focus and a position $(x, y, z)=(s, t, 0)$ of a same viewpoint on the lens plane of the image pickup apparatus (corresponding to the pupil plane) become light beams that are parallel to each other in the orthogonal coordinate system (XYZ) after coordinate transform. (Refer to FIGS. 1 to 3 and descriptions thereof in Patent Literature 1)

Light exiting a point where the subject exists in a perspective coordinate system (a real space prior to coordinate transform) passes through (p+s, q+t, f) (where f denotes a focal distance) and is refracted at the viewpoint position $(x, y, z)=(s, t, 0)$. This straight line may be represented by the following expression.

$$(x, y) = \frac{z}{f} \times (p, q) + (s, t) \text{ (where } z > 0\text{)} \quad \text{[Expression 1]}$$

The straight line represented by Expression 1 may be represented by the following expression in the orthogonal coordinate system (XYZ) after coordinate transform.

$$(X, Y)=(p,q)+(1-Z)\times(s,t) \text{ (where } Z \geq f) \quad \text{[Expression 2]}$$

Since substituting $Z=0$ $(z=f)$ and $Z=1$ $(z=\infty)$ into Expression 2 respectively results in $(X, Y, Z)=(p+s, q+t, 0)$ and $(X, Y, Z)=(p, q, 1)$, the gradient of the straight line in the orthogonal coordinate system $(X, Y, Z)$ may be represented by $(-s, -t, 1)$.

Therefore, a vector representing a line-of-sight direction in the orthogonal coordinate system after coordinate transform is (X, Y, Z)=(−s, −t, 1).

Moreover, when the imaging optical system is bilaterally telecentric, a three-dimensional out-of-focus blur in a plurality of images (a Z stack image) photographed while varying focal points in a depth direction is unchanged regardless of the Z position.

Therefore, a coordinate transform for making a three-dimensional out-of-focus blur unchanged regardless of spatial positions is not required. A gradient (−s, −t, za) of a straight line connecting a prescribed position (x, y, z)=(0, 0, za) of the subject in focus in real space and a viewpoint position (x, y, z)=(s, t, 0) on the lens plane may be regarded, without modification, as a line-of-sight direction.

(Correspondence Between a Viewpoint and a Polar Angle θ and an Observation Angle φ when Actually Observing a Sample)

Figure 23A:
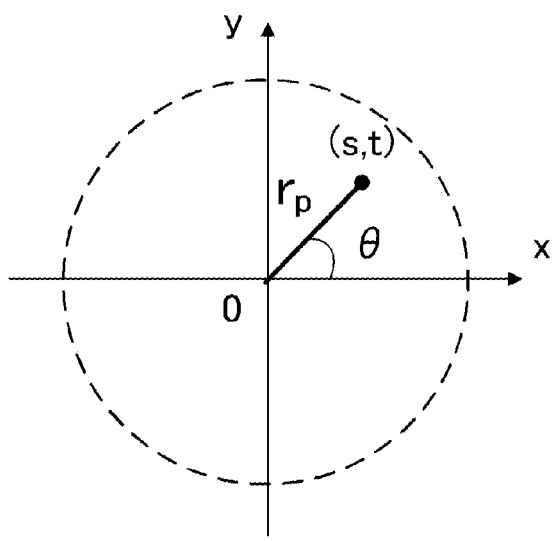
FIGS. 23A and 23B are schematic views showing a relationship between a polar angle of a viewpoint and an angle (observation angle) formed between a line-of-sight direction and an optical axis.
Figure 23B:
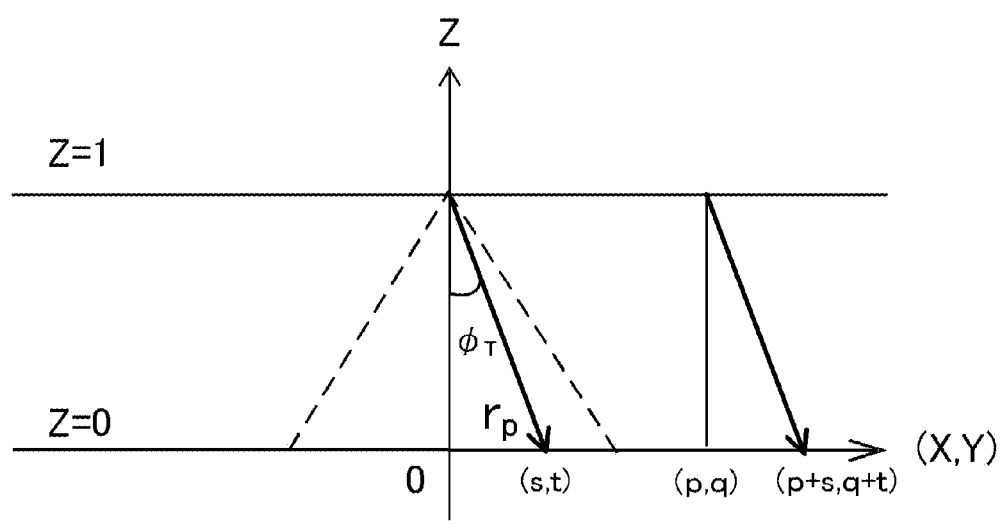

FIG. 23A is a schematic view representing a viewpoint position (x, y, z)=(s, t, 0) in real space, and FIG. 23B is a schematic view representing a light beam that passes through the viewpoint position (x, y, z)=(s, t, 0) in an orthogonal coordinate system (XYZ).

A dotted-line circle shown in FIG. 23A represents a range in which light beams can pass through on the lens plane (z=0). If the polar angle θ is defined as an angle formed between the viewpoint position (x, y, z)=(s, t, 0) on the lens plane and an x axis on the lens plane (z=0) or an angle formed between a straight line when a viewpoint (−s, −t, 1) is projected on an xy plane and the x axis, then the polar angle θ may be obtained by the following expression.

$$\theta = \tan^{-1}\left(\frac{t}{s}\right) \qquad \text{[Expression 3]}$$

However, θ is adjusted to stay within a range of −180 to +180 degrees in accordance with signs of t and s.

Next, a relationship between a viewpoint and an observation angle $\varphi_T$ on a transformed coordinate will be described with reference to FIG. 23B.

In FIG. 23B, a straight line represented by Expression 2 and a straight line obtained by substituting a point p=0, q=0 on the optical axis into Expression 2 are depicted by solid line arrows.

According to Patent Literature 1, Z=0 in the orthogonal coordinate system (XYZ) corresponds to z=f (or z=−∞) in the perspective coordinate system (xyz), and Z=1 corresponds to z=∞ (or z=−f). Therefore, FIG. 23B shows that a luminous flux from infinity (Z=1) in the orthogonal coordinate system (XYZ) has a spread on a focal plane (Z=0) in front of the lens plane. (Refer to FIG. 3 and a description thereof in Patent Literature 1)

At this point, if the observation angle $\varphi_T$ on the transformed coordinate is defined as an angle formed between the viewpoint (−s, −t, 1) and the optical axis (Z axis), since the viewpoint is not dependent on a position of the subject as is apparent from FIG. 23B, the observation angle $\varphi_T$ may be obtained by the following expression.

$$\varphi_T = \tan^{-1}(\sqrt{s^2+t^2}) \qquad \text{[Expression 4]}$$

Moreover, the two dotted lines in FIG. 23B represent light beams that pass through outermost edges on the lens plane. If an aperture radius of the lens in the perspective coordinate system (xyz) prior to coordinate transform is denoted by ra, then a viewpoint image can only be calculated when the viewpoint position (x, y, z)=(s, t, 0) is within the radius ra.

Next, a polar angle θ and an observation angle φ corresponding to a viewpoint when actually observing a sample will be described.

According to Snell's law, when a light beam is incident to a boundary between different refractive indexes, a product of an incidence angle of the light beam and a refractive index of an incident-side medium is equal to a product of a refraction angle of the light beam and a refractive index of a refraction side medium. Since a refractive index of the sample is greater than a refractive index of air, an observation angle in the sample is smaller than an observation angle in air. Therefore, a three-dimensional out-of-focus blur in the sample which is constituted by refracted light beams is smaller than the three-dimensional out-of-focus blur in air. However, since a viewpoint position is calculated in the present example based on a three-dimensional imaging relationship between a sample and a three-dimensional out-of-focus blur in the sample, an effect of the refractive index of the sample need not be considered and the polar angle θ and the observation angle φ represent an observation direction in the sample without modification.

When the imaging optical system is bilaterally telecentric, since coordinate transform is not required, assuming that a sensor pixel pitch in the x direction and the y direction is the same, the observation angle φ may be represented by the following expression using the sensor pixel pitch Δx in the x direction and a movement interval Δz (μm) in the z direction.

$$\phi = \tan^{-1}\left(\Delta x \times \frac{\sqrt{s^2+t^2}}{\Delta z}\right) \qquad \text{[Expression 5]}$$

Moreover, when the imaging optical system is not bilaterally telecentric, the observation angle φ may be obtained using a sensor pixel pitch ΔX in the X direction and a movement interval ΔZ in the Z direction in the orthogonal coordinate system (XYZ) in place of Δx and Δz in Expression 5.

This concludes the description of a polar angle θ and an observation angle φ corresponding to a viewpoint when actually observing a sample.

In the following description, a viewpoint position (x, y, z)=(s, t, 0) on the lens plane will be abbreviated as a viewpoint (s, t). In addition, since the following description will be given on the premise of image processing on the orthogonal coordinate system (XYZ), unless otherwise noted, only the viewpoint position (s, t) is to represent a position on a perspective coordinate system (a real space prior to coordinate transform) and other positions are to represent positions in the orthogonal coordinate system (XYZ).

By applying the method according to Patent Literature 1 on a Z stack image acquired by the image pickup apparatus shown in FIG. 5, a viewpoint image with a varied viewpoint position or, in other words, a varied observation direction can be generated.

A viewpoint image calculated by the method according to Patent Literature 1 has a significantly deep (infinite) depth of field and boundaries between substances in the sample with different transmittance can be clearly seen.

Figure 6A:
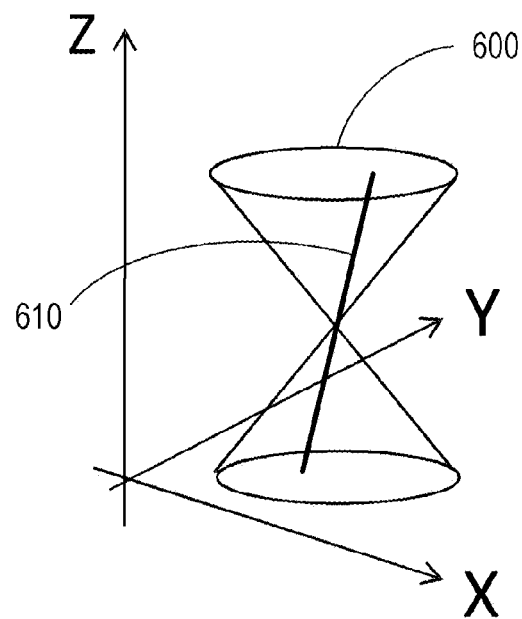
FIGS. 6A and 6B are schematic views for explaining a reason for contrast enhancement in a viewpoint image.

FIG. 6A is a diagram showing a three-dimensional blur of an optical system in the orthogonal coordinate system (XYZ). Reference numeral 600 represents a shape of the three-dimensional blur and shows how there is only a slight out-of-focus blur at a focusing position (apexes of the two cones) but the out-of-focus blur spreads as the Z position separates from the focusing position. Using the method according to Patent Literature 1, a viewpoint image constituted by light beams in an arbitrary line-of-sight direction (for example, a straight line 610) that passes inside the cone 600 from the Z stack image can be generated.

Figure 6B:
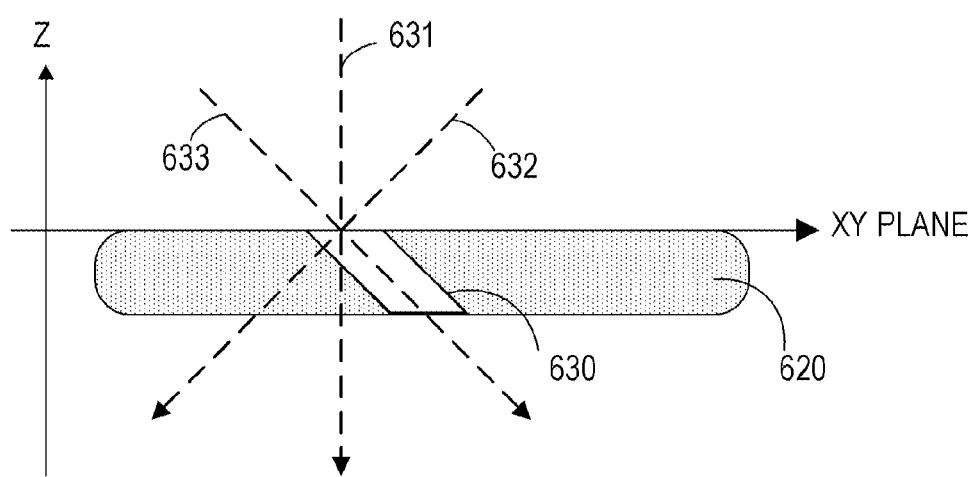

FIG. 6B shows a situation where a pathological sample (specimen) in the orthogonal coordinate system (XYZ) is seen from a different direction. A diagonal cavity 630 exists inside a sample 620 in FIG. 6B.

Since segments other than the cavity 630 are seen through when observed from a direction 631, a contrast of a wall surface of the cavity 630 is unclear. The same applies when observed from a direction 632 and the contrast of the cavity 630 remains unclear. However, when observed from a direction 633 along the wall surface of the cavity 630, since there are no effects from other segments, the contrast of the wall surface of the cavity 630 becomes clear. Moreover, a state of a relatively high contrast can be maintained even if the line-of-sight direction somewhat differs from the direction of the wall surface of the cavity.

On the other hand, in a Z stack image of the sample 620, since layer images at any Z position (focusing position) are affected by a multi-directional luminous flux including light beams in the directions 631 to 633, the contrast of the wall surface of the cavity does not become clearer than in the observation image from the direction 633. In addition to a cavity, this phenomenon also applies to a nucleus, a cell membrane, a fiber, and the like.

This shows that an edge can be more easily detected by using a viewpoint image with a clear contrast than using a Z stack image or a layer image which is an original image without modification. Therefore, by decomposing a Z stack image to viewpoint images ("decomposition to viewpoint images" has the same meaning as "generation of a viewpoint image") and performing edge extraction processing or edge enhancement processing on the viewpoint image, edge detection performance can be improved. According to this method, an edge of a weak-contrast structure that is conventionally difficult to detect from an original image (a layer image) can now be detected with accuracy and information useful for image analysis and image diagnosis can be more readily obtained.

Moreover, in the present description, an operation for extracting only an image of an edge portion or information on the edge portion from an image will be referred to as edge extraction and an operation for improving identifiability of an image of an edge portion or information on the edge portion in an image will be referred to as edge enhancement. However, when edge extraction and edge enhancement need not particularly be distinguished, the term "edge processing" will be used as a term encompassing both edge extraction and edge enhancement and an image representing an edge that is extracted or enhanced by edge processing will be referred to as an edge image.

Hereinafter, specific examples of the image generating apparatus 100 will be described.

EXAMPLE 1

Edge Extraction Setting Screen

Figure 7A:
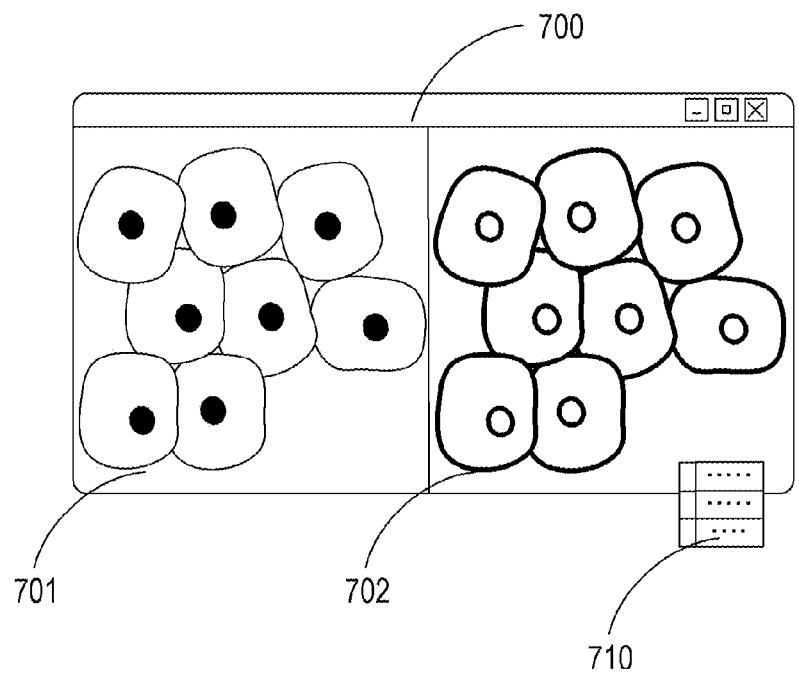
FIGS. 7A and 7B are diagrams showing an example of a GUI of an edge extracting function according to Example 1.
Figure 7B:
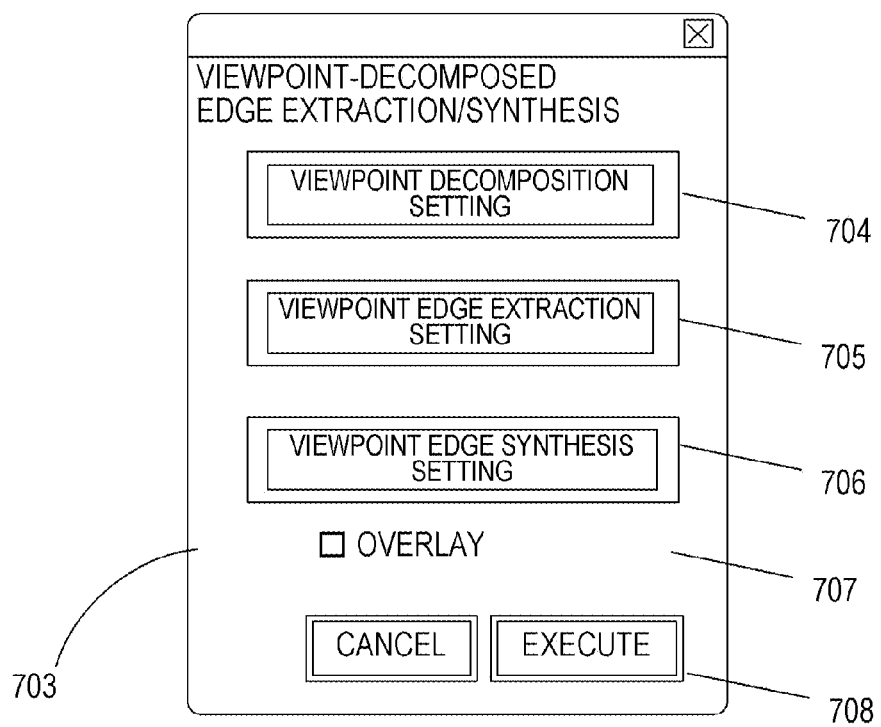

FIGS. 7A and 7B show examples of setting screens of an edge extracting function according to Example 1.

After selecting a region 207 in a displayed image in the image display application shown in FIG. 2 using a mouse, an item named "viewpoint-decomposed edge extraction" (not shown) is selected from an extensions menu 208 that is displayed by a right click of the mouse. In response thereto, a new window 700 (FIG. 7A) showing images before and after the edge extraction processing and an edge extraction processing setting screen 703 (FIG. 7B) are displayed. The image in the region 207 is displayed in a left-side region 701 of the window 700 and an image resulting from the edge extraction processing is displayed in a right-side region 702 of the window 700.

The setting screen 703 is operated when modifying settings of the edge extracting function. When the user presses a viewpoint decomposition setting button 704 with the mouse, a setting screen for determining a direction (a three-dimensional observation direction) of the viewpoint image used for edge extraction is displayed. Moreover, there may be one or a plurality of viewpoints. Details will be given later. When the user presses a viewpoint edge extraction setting button 705, a viewpoint edge extraction setting screen for setting a method or parameters for extracting an edge from a viewpoint image is displayed. Various methods can be selected as a method of extracting an edge. Details of these methods will be given later. When the user presses a viewpoint edge synthesis setting button 706, a setting screen for generating an image (hereinafter, referred to as a viewpoint edge synthesized image) which synthesizes images (hereinafter, referred to as viewpoint edge extracted images) representing an edge extracted from the viewpoint image is displayed. At this point, setting of weighting on each viewpoint edge extracted image is configured. In addition, if necessary, setting of a noise elimination parameter and the like after synthesizing the viewpoint edge extracted images can be optionally configured. Details will be given later. An overlaid display 707 is a check box. By enabling this setting, the image in the selection region 207 and an edge extracted image are displayed overlaid on each other in the right-side region 702. When the user configures the settings described above as necessary and then presses an execute button 708, a viewpoint image is generated, an edge is extracted, and a processing result is displayed. Details will be given later.

Reference numeral 710 denotes an extensions menu that can be called by right-clicking inside the window 700. Items for image analysis such as N/C ratio calculation (not shown) are lined up in the extensions menu 710. By selecting an item, an image analysis processing setting screen (not shown) is displayed, analysis processing is executed on a selection region in the window or on the entire window and a processing result is displayed. Details will be given later.

(Edge Extraction Processing)

Figure 8:
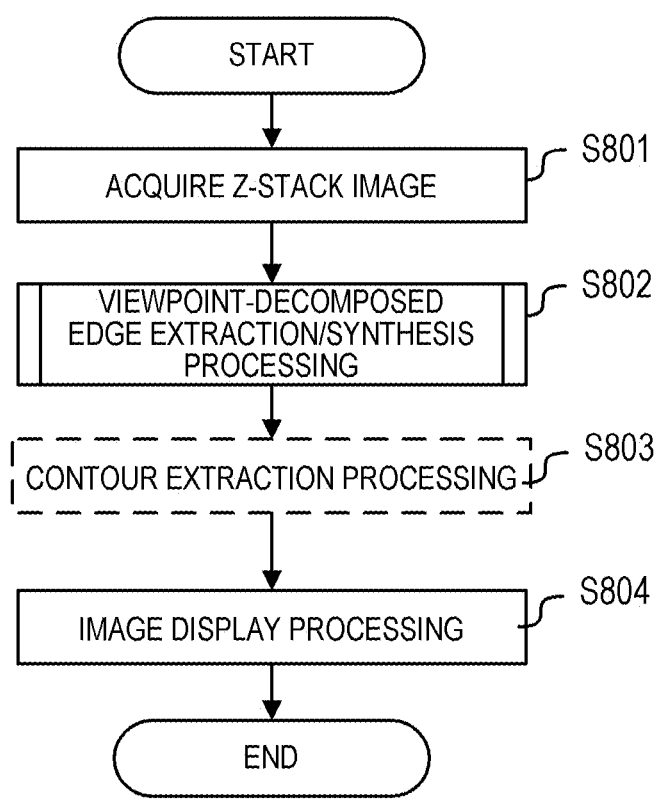
FIG. 8 is a flow chart showing an overall flow of edge extraction processing according to Example 1.

FIG. 8 shows a flow of edge extraction processing that is executed when the execute button 708 described above is pressed. This processing is realized by the image display application and the image generation program that is invoked from the image display application.

In a Z stack image acquiring step S801, based on coordinates of the image selection region 207 displayed by the image display application, data of a necessary range is acquired from a Z stack image stored in the main memory 302 or the storage device 130. Alternatively, when the Z stack image exists in the other computer system 140, data is acquired through the network I/F 304 and stored in the main memory 302.

Subsequently, in a viewpoint-decomposed edge extraction/synthesis processing step S802, based on information on a viewpoint which determines a line-of-sight direction with respect to the subject (an observation direction), viewpoint images corresponding to a plurality of viewpoints are generated from the Z stack image (this operation is also referred to as a decomposition into viewpoint images). In addition, an edge is extracted from each viewpoint image to generate a viewpoint edge extracted image, and the viewpoint edge extracted images are synthesized to generate a viewpoint edge synthesized image. Details will be given later.

Next, in a contour extraction processing step S803, a contour extracted image which represents a contour extracted from the viewpoint edge synthesized image is generated. It should be noted that the processing of step S803 is not essential and whether or not to apply the processing of step S803 can be modified according to settings (not shown). Details will be given later.

Finally, in an image display processing step S804, the contour extracted image, the viewpoint edge extracted image, or the viewpoint edge synthesized image is enlarged/reduced in accordance with a display magnification of the image display application and displayed in the right-side region 702. When the overlaid display 707 is enabled, the contour extracted image, the viewpoint edge extracted image, or the viewpoint edge synthesized image is displayed overlaid on the image in the selection region 207. In doing so, an image to which the viewpoint edge extracted image or the viewpoint edge synthesized image of a corresponding position is added to the image in the selection region 207 may be displayed in the right-side region 702. Furthermore, an image obtained by performing tone correction on the added image so that brightness approximates that of the image in the selection region 207 may be displayed in the right-side region 702. An animation display which switches among the plurality of viewpoint edge extracted images at a constant time interval may be performed. In this case, the contour extracted image, the viewpoint edge extracted image, or the viewpoint edge synthesized image may be displayed in a different color for each channel (RGB) or may be changed to another color that differs from the color of the sample. The images used for display in this case (the contour extracted image, the viewpoint edge extracted image, the viewpoint edge synthesized image, and an image obtained by compositing these images with the original image) are all observation images suitable for image observation and image diagnosis.

(Viewpoint-Decomposed Edge Extraction/Synthesis Processing)

Figure 9:
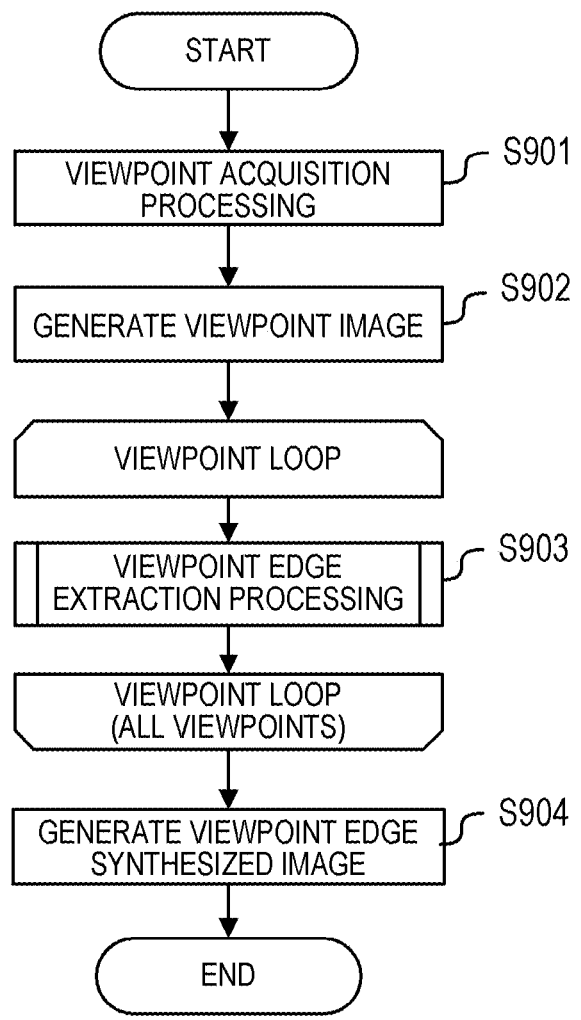
FIG. 9 is a flow chart showing viewpoint-decomposed edge extraction/synthesis processing S802 according to Example 1.

FIG. 9 is a flow chart showing internal processing of the viewpoint-decomposed edge extraction/synthesis processing S802.

First, in a viewpoint acquisition processing step S901, positional information of a viewpoint necessary for generating a viewpoint image in a subsequent step S902 is acquired. In step S901, positional information of a viewpoint determined in advance may be acquired from the main memory 302, the storage device 130, or the other computer system 140. Alternatively, in step S901, positional information of a viewpoint may be obtained by calculation based on information set on the image display application. Details will be given later.

Subsequently, in a viewpoint image generation step S902, a viewpoint image corresponding to the viewpoint obtained in step S901 is generated based on the Z stack image of the selection region 207 acquired in step S801. Moreover, as a method of generating an arbitrary viewpoint image from a Z stack image (an MFI arbitrary viewpoint/out-of-focus blur image generating method), any method including the methods according to Patent Literature 1 and Non-Patent Literature 2, 3 and 4 may be used.

Next, in a viewpoint edge extraction processing step S903, edge extraction processing is performed on the generated viewpoint image based on the viewpoint edge extraction setting (705). When there are a plurality of viewpoints, the viewpoint edge extraction processing is executed for each of the viewpoints. Details will be given later.

Subsequently, in a viewpoint edge synthesized image generating step S904, based on the viewpoint edge synthesis setting (706), the plurality of viewpoint edge extracted images generated in step S903 are composited to generate a viewpoint edge synthesized image. Details will be given later.

Hereinafter, details of the viewpoint acquisition processing step S901, the viewpoint edge extraction processing step S903, and the viewpoint edge synthesized image generating step S904 will be described.

(Viewpoint Acquisition Processing Step S901)

Hereinafter, a case in which positional information of a viewpoint is calculated in the viewpoint acquisition processing step S901 based on the viewpoint decomposition setting (704) will be described.

Figure 10A:
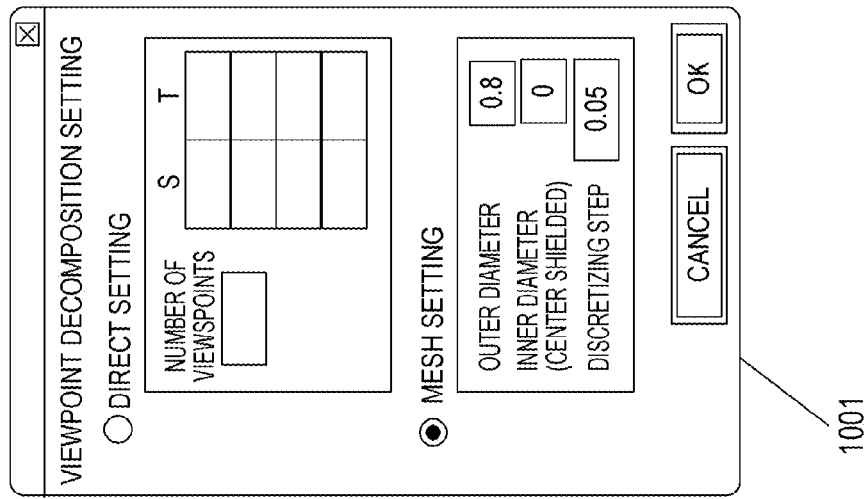
FIGS. 10A to 10C are diagrams showing examples of GUIs for various settings of the edge extracting function according to Example 1.

A viewpoint decomposition setting screen 1001 shown in FIG. 10A is an example of a setting screen that is displayed when the viewpoint decomposition setting button 704 is pressed. In this case, a viewpoint position of a viewpoint image used for edge extraction is set.

The setting screen 1001 offers two options as viewpoint setting methods: direct setting and mesh setting. In direct setting, the number of viewpoints and a viewpoint position (s, t) are directly specified by the user. On the other hand, in mesh setting, an outer diameter, an inner diameter (center shielded), and a discretizing step are specified by the user, and a position of each viewpoint is calculated from the specified values.

A maximum deviation of a calculated viewpoint is specified for "outer diameter" and a minimum deviation of a calculated viewpoint (in other words, a maximum deviation of a viewpoint not calculated) is specified for "inner diameter (center shielded)". In this case, values of the outer diameter and the inner diameter (center shielded) are set according to distances (radii) centered on an origin on the lens plane. Moreover, a value exceeding a radius ra of the optical system on the lens plane cannot be set as the outer diameter. "Discretizing step" is an increment interval for discretely setting positions of viewpoints for which viewpoint images are generated within a donut-shaped region created by subtracting a circle defined by the "inner diameter" from a circle defined by the "outer diameter". The finer the discretizing step, the larger the number of viewpoints to be calculated.

Moreover, various shapes can be set in addition to the circles described above. For example, a plurality of concentric circles with different radii or straight lines radially extending from a center can be set. When concentric circles are set, a discretizing step (for example, an angular interval setting) that determines a radius of each circle or a density of viewpoints on each circle can be set. In addition, in the case of straight lines radially extending from a center, a discretizing step that determines an interval of lines (for example, an angular interval setting) or a density of viewpoints on the radial lines can be set.

(Viewpoint Edge Extraction Processing Step S903)

Figure 10B:
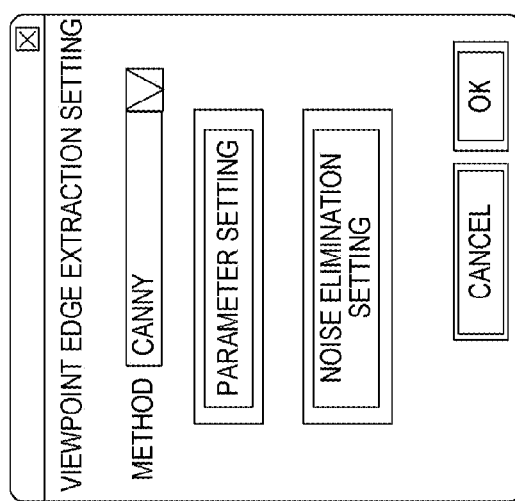

A viewpoint edge extraction setting screen 1002 shown in FIG. 10B is an example of a setting screen that is displayed when the viewpoint edge extraction setting button 705 is pressed. In this case, an edge extracting method or parameters used when performing edge extraction from a viewpoint image are set.

A method field in the setting screen 1002 enables selection of an edge extracting method to be applied to a viewpoint image.

A large number of methods are available as the edge extracting method. Examples of edge extracting filters include primary differential filters such as a Sobel filter and a Prewitt filter and secondary differential filters such as a Laplacian filter and a LOG (Laplacian Of Gaussian) filter that is a derived form of a Laplacian filter. Another example of an edge extracting filter is a high-pass filter and a bandpass filter which operate on a Fourier frequency. In addition, another method of edge extraction involves subjecting an image to a Fourier transform and performing an inverse Fourier transform after normalizing an amplitude spectrum to 1 in order to obtain a Fourier phase image with enhanced shape information. A zero cross detecting method in which a position where a secondary differentiation becomes zero and Prewitt template matching which detects an edge using an array with directionality can also be applied. Furthermore, edge extraction by a Gabor filter that is used in facial recognition or fingerprint recognition or a Canny Edge Detector that is often used in the field of computer vision can also be applied. In addition, a bilateral filter that is a noise eliminating method eliminates noise while retaining an edge. Since a difference between an edge and a flat region is enhanced by repetitively applying a bilateral filter, this method can also be used as an edge extracting method. Furthermore, edge extraction can also be carried out by combining the methods described above.

As shown, various methods or combinations thereof can be used for the edge extraction processing applied to a viewpoint image. However, in the present example, in order to improve detection performance when detecting an edge from a viewpoint edge synthesized image, edge extraction processing without linearity (in other words, non-linear edge extraction processing) is desirably used. A reason therefor will be described below.

Generally, linearity refers to a function f(x) having the following properties.

With respect to arbitrary x and y, f(x+y)=f(x)+f(y)
With respect to arbitrary x and a, f(ax)=af(x)

Since edge extraction processing can be regarded as a function with respect to an image, the linearity of the edge extraction processing can be defined in the same way.

For example, if the edge extraction processing is denoted by h and an i-th viewpoint image is denoted by Ii, when the edge extraction processing has linearity, $$\Sigma h(I_i) = h(\Sigma I_i) \qquad \text{[Expression 6]}$$

is satisfied. This expression shows that a viewpoint edge synthesized image Σh(Ii) resulting from the synthesis of a viewpoint edge extracted image h(Ii) obtained from each viewpoint image Ii is equivalent to an edge extraction processing result h (ΣIi) with respect to a viewpoint composite image ΣIi.

In other words, edge extraction processing without linearity means that a result h (ΣIi) of edge extraction processing performed on a composite image ΣIi that has been composited from a plurality of images Ii and a result Σh(Ii) of compositing the respective images Ii after being subjected to the edge extraction processing are not consistent with each other.

As described earlier, with a viewpoint composite image, light beams gather from various directions and a contrast of an object before and after a focusing position tends to decline. Therefore, using edge extraction processing with linearity causes an edge extraction effect at each viewpoint image to cancel each other when synthesizing the viewpoint edge extracted images and the edge extraction effect weakens as a whole. For this reason, edge extraction processing with nonlinearity is desirably used to ensure that the edge extraction effects do not cancel each other due to synthesis.

The nonlinearity of edge extraction processing is satisfied by using a nonlinear filter. Even when a filter with linearity is used, nonlinearity can be achieved by subjecting outputs of the filter (edge extraction results) to processing (for example, an absolute value, a squared value, and binarization) and then synthesizing the processing outputs. For example, with a Sobel filter or a Prewitt filter, after obtaining differential values in the x direction and the y direction with respect to a pixel position I(i, j) in an image, a gradient magnitude g(i, j) is obtained. Examples of calculation formulas of the gradient include the following. All of the calculation formulas realize nonlinearity while using a linear filter.

$$g(i,j) = \sqrt{f_x^2 + f_y^2} \text{ or}$$

$$g(i,j) = |f_x| - |f_y| \text{ or}$$

$$g(i,j) = \max(|f_x|, |f_y|) \qquad \text{[Expression 7]}$$

where fx=I(i+1, j)−I(i−1, j), fy=I(i, j+1)−I(i, j−1), and max( ) denotes a function for obtaining a maximum value from arguments in parentheses.

In addition, it is also effective to vary the filter applied to each viewpoint image. As shown in the expression below, if a function of a filter operation applied to an i-th viewpoint image is denoted by hi, linearity is not satisfied unless all hi share the same filter.

$$\sum_i h_i(I_i) \ne h\left(\sum_i I_i\right) \qquad \text{[Expression 8]}$$

In edge extraction processing, parameters of the applied edge extraction processing are favorably modified in accordance with a line-of-sight direction of a viewpoint image. In a viewpoint image, a contrast of a structure in a direction similar to the line-of-sight direction becomes clearer than in an original image and a contrast of structures in other directions are unlikely to become clearer. Therefore, by modifying the parameters of the edge extraction processing so that an edge perpendicular to the line-of-sight direction in an XY plane is extracted or enhanced, edge extraction or edge enhancement can be performed in an efficient (effective) manner. As a specific method, a coefficient of a filter may be adaptively modified in accordance with a line-of-sight direction so that the line-of-sight direction and an edge detection direction are consistent with each other.

FIGS. 11A to 11H show examples of a 3×3 template used in Prewitt template matching. Arrows described below the 3×3 templates indicate edge detection directions. An edge detection direction can be controlled by varying an array of nine coefficients that make up a filter. When using these filters, an edge detection direction indicated by an arrow may be conformed to the line-of-sight direction in the XY plane.

Alternatively, a two-dimensional Gabor filter can be used as a filter for detecting an edge that is perpendicular to the line-of-sight direction. A two-dimensional Gabor filter is a filter expressed as a product of a Gaussian function and a cos function and is represented by the expression below.

$$g(X, Y, \lambda, \theta, \psi, \sigma, \gamma) = \exp\left(-\frac{X'^2 + \gamma^2 Y'^2}{2\sigma^2}\right) \cos\left(2\pi \frac{X'}{\lambda} + \psi\right)$$ [Expression 9]

where
X'=X cos θ+Y sin θ, Y'=−X sin θ+Y cos θ

λ denotes a wavelength component of the cos function part, ψ denotes a phase offset of the cos function part, θ denotes a direction of a striped pattern of the function, σ denotes a variance of the Gaussian function part, and γ denotes an aspect ratio of the Gaussian function part.

Since a two-dimensional Gabor filter can vary coefficients in an arbitrary direction, an edge extracting effect can be further improved by creating a filter that conforms to a line-of-sight direction of the viewpoint image to be generated.

Figure 12:
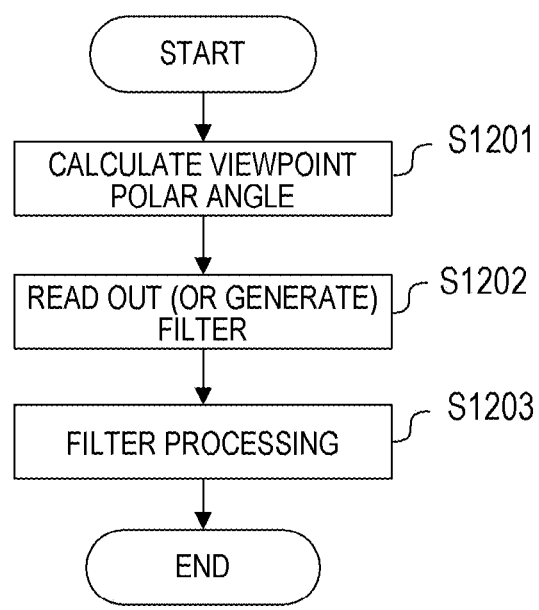
FIG. 12 is a flow chart showing viewpoint edge extraction processing S903 that is dependent on a line-of-sight direction.

FIG. 12 is a flow chart showing internal processing of the viewpoint edge extraction processing S903 that is dependent on a line-of-sight direction. As shown in FIG. 9, the processing shown in FIG. 12 is repetitively executed for all viewpoints.

First, in a viewpoint polar angle calculating step S1201, a polar angle of a viewpoint that is a processing object is calculated. As shown in FIG. 23A, if a position of a prescribed viewpoint is denoted by $(s_p, t_p)$, then a polar angle $\theta_p$ of the viewpoint can be calculated by $$\theta_p = \tan^{-1}(t_p/s_p).$$ [Expression 10]

However, the polar angle is adjusted to stay within a range of −180 to +180 degrees in accordance with signs of s and t.

Moreover, a radius $r_p$ of the viewpoint can be calculated by $$r_p = \sqrt{s_p^2 + t_p^2}.$$ [Expression 11]

In addition, the position $(s_p, t_p)$ of the viewpoint can be expressed using the polar angle $\theta_p$ and the radius $r_p$ as $$(s_p, t_p) = (r_p \cos \theta_p, r_p \sin \theta_p).$$ [Expression 12]

Next, in step S1202, a filter is read out or generated based on the polar angle of the viewpoint calculated in step S1201.

When the arrays of Prewitt template matching shown in FIGS. 11A to 11H are used as the edge extracting filter dependent on the line-of-sight direction, since directions are limited to eight directions, an array whose direction is closest to the polar angle of the viewpoint is selected and a filter is readout. In addition, a two-dimensional Gabor filter can also be used as an edge extracting filter, and by setting the polar angle of the viewpoint as θ, a filter whose coefficients vary along an arbitrary line-of-sight direction can be generated. Moreover, λ and σ of the two-dimensional Gabor filter may be default values based on a pixel pitch and magnification or may be values corresponding to the radius of a viewpoint. Alternatively, λ and σ may be varied based on features of the subject or the like.

Subsequently, in a filter processing step S1203, filter processing is performed on the viewpoint image using the filter read out or generated in step S1202 to extract an edge.

A modification of the processing shown in FIG. 12 will now be described. As is the case of Prewitt template matching or edge extraction using a Gabor filter, it is possible to apply filters of a plurality of directions (for example, eight directions) to a single viewpoint image to improve edge extraction performance in the plurality of directions while preventing linearity from being satisfied. For example, by enhancing a result of edge extraction performed by a filter corresponding to the polar angle of a viewpoint more than results of other filters for each viewpoint image and synthesizing the enhanced results, intensities of filters are varied depending on viewpoints. Therefore, linearity is not satisfied even if a filter is fixed.

Figure 13:
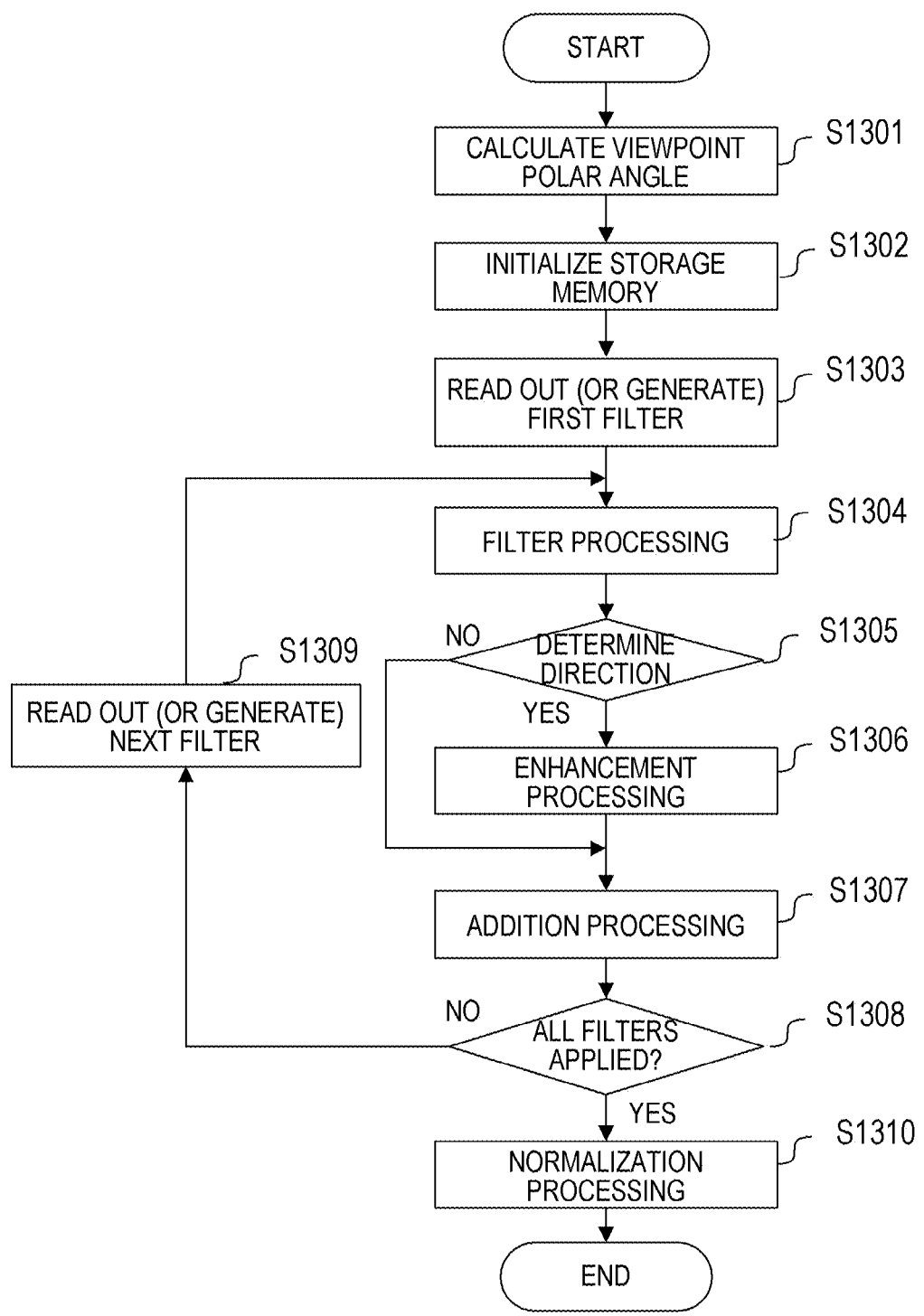
FIG. 13 is a flow chart showing the viewpoint edge extraction processing S903 that is dependent on a line-of-sight direction.

FIG. 13 shows an example of a flow chart of internal processing of viewpoint edge extraction processing that is dependent on a line-of-sight direction when edge extraction is performed from multiple directions for each viewpoint image. The processing shown in FIG. 13 is repetitively executed for each viewpoint in a similar manner to the processing shown in FIG. 12.

In a viewpoint polar angle calculating step S1301, a polar angle of a viewpoint that is a processing object is calculated in a similar manner to step S1201.

Next, in step S1302, a variable A1 that stores a sum of an intensity variable magnification of each filter direction and a two-dimensional buffer B1 that stores viewpoint edge extracted images are respectively initialized to zero.

Subsequently, in step S1303, a first filter among filters that are repetitively applied to each individual viewpoint image is read out or generated. For example, when the eight filters depicted in FIGS. 11A to 11H are sequentially applied, a filter set first (for example, FIG. 11A) is read out. Alternatively, when N-number (for example, 16) of two-dimensional Gabor filters with different θ are applied to each individual viewpoint image, a first angle θ is set and a two-dimensional Gabor filter is read out or generated.

Next, in a filter processing step S1304, filter processing is performed on the viewpoint image that is a processing object using the filter read out or generated in step S1303 or step S1309.

Subsequently, in a direction determining step S1305, a determination is made on whether not the polar angle of the viewpoint obtained in the viewpoint polar angle calculating step S1301 and the edge detection direction of the filter applied to a viewpoint image in the filter processing step S1304 are consistent with each other or whether not a difference Δθ between both angles is within a prescribed range. A determination of whether or not a difference in angles is within a prescribed range is made in order to determine whether or not an edge detection direction of a present filter is closer to the polar angle of the viewpoint than an edge detection direction of an adjacent filter. For example, when applying the eight filters depicted in FIGS. 11A to 11H, the prescribed range is −22.5 degrees or more and less than 22.5 degrees.

When a determination result of the direction determining step S1305 is true, an intensity variable magnification M (where M is a real number larger than 1; for example, M=3) is added to the variable A1 and the processing proceeds to step S1306. If false, 1 is added to the variable A1 and a transition is made to an addition processing step S1307.

In an enhancement processing step S1306, a pixel value of an image that is the filter processing result obtained in the filter processing step S1304 is enhanced by a factor of M. For example, when using the eight filters depicted in FIGS. 11A to 11H, if the polar angle of the viewpoint is 0 degrees, a direction of a filter is also 0 degrees, and the angles are consistent with each other, the pixel value of an image that is the filter processing result is multiplied by M.

Next, in the addition processing step S1307, a result of edge extraction (depending on conditions, intensity is further multiplied by M) performed on a viewpoint image is added to the two-dimensional buffer B1.

Subsequently, in S1308, a determination is made on whether or not all filters have been applied to the viewpoint image that is a processing object. If false, a transition is made to step S1309 to read out or generate a next filter, and a transition is made to the filter processing step S1304. If true, a transition is made to a normalization processing step S1310.

Next, in the normalization processing step S1310, a value of each pixel of the two-dimensional buffer B1 is divided by the value of the variable A1.

Due to the processing described above, even when multiple filters are applied to one viewpoint image, viewpoint edge extraction processing in which linearity is not satisfied can be realized.

Alternatively, in the filter processing step S1304, nonlinearity may be achieved by obtaining an absolute value or a square value of the filter processing result. Even in this case, in a similar manner, when the polar angle of the viewpoint and the filter direction are consistent with each other in the directionality determining step S1305, an effect of the edge extraction processing can be improved by making a transition to the enhancement processing step S1306 and enhancing the processing result.

In addition, as already described, linearity can be prevented from being satisfied by methods other than the processing shown in FIG. 13. For example, nonlinearity can be realized by collecting processing results of linear filters applied from a plurality of directions in a similar manner to a Sobel filter or a Prewitt filter, and obtaining a square root of a sum of square values, a sum of absolute values, a maximum value of absolute values, or the like of the processing results as a final filtering result.

Moreover, the viewpoint edge extraction processing may be performed on a Fourier transform. In the case of a large filter such as a two-dimensional Gabor filter, filter processing takes less time on a Fourier transform. In this case, an inverse Fourier transform need not be performed after the processing and an inverse transform may be performed during subsequent generation of a viewpoint edge synthesized image.

In addition, a noise elimination setting can be configured on the viewpoint edge extraction setting screen 1002. Binarization by a threshold, a median filter, a bilateral filter which enables noise elimination while retaining an edge, or the like can be applied as the noise elimination setting. Due to this processing, an edge with clearer contrast can be extracted and an N/C ratio can be more readily detected.

(Viewpoint Edge Synthesized Image Generating Step S904)

Figure 10C:
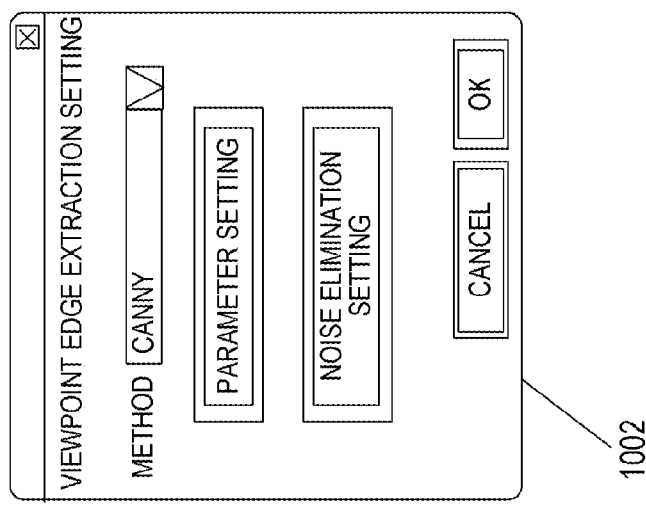

A viewpoint edge synthesis setting screen 1003 shown in FIG. 10C is an example of a setting screen that is displayed when the viewpoint edge synthesis setting button 706 is pressed. At this point, a compositing method used when synthesizing viewpoint edge extracted images is set. The setting screen 1003 has a list box for selecting a compositing method to be used when synthesizing the respective edge extracted images. Various compositing methods such as "equal", "Gaussian blur", and "select/composite maximum value" can be selected. In this case, "equal" represents a method of compositing the respective edge extracted images using equal weighting and "Gaussian blur" represents a method using weighting obtained by a Gaussian function in accordance with a distance from an origin (on the optical axis) of each viewpoint. In addition, "select/composite maximum value" represents a method of creating a composite image with a same size as the respective edge extracted images by comparing pixel values at a same position on the respective edge extracted images and selecting a maximum pixel value.

In the viewpoint edge synthesized image generating step S904, a plurality of viewpoint edge extracted images are synthesized to generate a viewpoint edge synthesized image.

Moreover, when the viewpoint edge extracted images are Fourier space frequency expressions, the synthesis is performed on a Fourier transform and an inverse Fourier transform is subsequently performed. Since linearity is satisfied in a Fourier transform, a spatial synthesis and a synthesis on a frequency followed by an inverse transform produce the same result.

In addition, in the viewpoint edge synthesized image generating step S904, noise elimination may be performed in order to eliminate noise included in edge extracted images in a similar manner to the viewpoint edge extraction processing step S903. In this case, a noise elimination setting is configured on the setting screen 1003.

It should be noted that the setting screens shown in FIGS. 10A to 10C merely represent examples. A function for configuring default settings or a function that automatically sets optimum values is desirably provided so that a pathologist who is the user can promptly make observations and diagnoses without being hassled by settings.

This concludes the description of the viewpoint-decomposed edge extraction/synthesis processing (S802 in FIG. 8) according to the present example.

(Contour Extraction Processing)

Next, an example of contour extraction processing (S803 in FIG. 8) will be described.

While an edge is enhanced in a viewpoint edge synthesized image, the viewpoint edge synthesized image also contains high and low levels of noise and signals. In consideration thereof, contour extraction processing is performed to make a contour more visible. For example, a contour can be extracted by binarizing a viewpoint edge synthesized image (a value determined in advance may be used as a binarization threshold or a binarization threshold may be dynamically determined) and subsequently repeating expansion/contraction processing. In addition, other contour extracting methods include various known techniques and, in this case, any method can be used. Furthermore, by adding a line thinning process, accuracy of positions where a contour exists can be improved. As a result of the processing, a contour extracted image is obtained from the viewpoint edge synthesized image.

(Display/Analysis of Image)

Subsequently, after the image display processing S804, by displaying the viewpoint edge extracted image, the viewpoint edge synthesized image, or the contour extracted image on the image display application, a cell boundary between cells, a boundary between a cell and a sinusoid, and the like can be made more distinguishable. Accordingly, the pathologist can more easily visualize a three-dimensional structure of an affected tissue.

Furthermore, by invoking the extensions menu 710 by right-clicking the mouse in the window 700 and selecting an item such as N/C ratio (nucleus/cytoplasm ratio) calculation or the like, image analysis can be performed.

Figure 14:
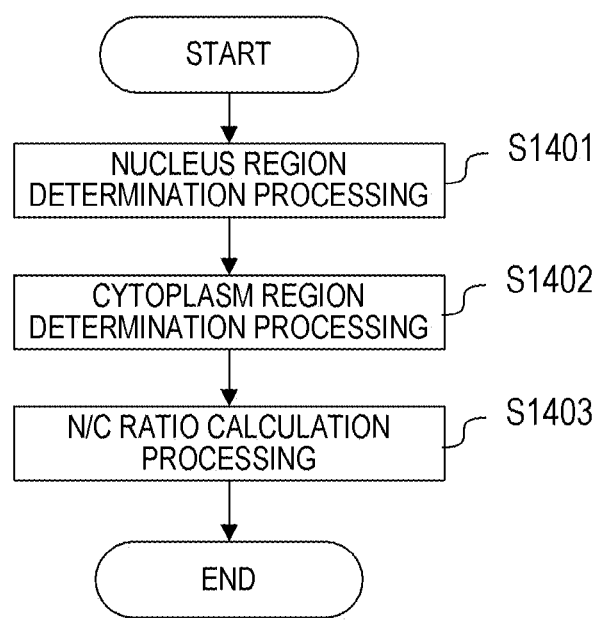
FIG. 14 is a flow chart showing a processing flow of N/C ratio calculation according to Example 1.

FIG. 14 shows an example of a processing flow of N/C ratio calculation.

N/C ratio calculation is premised on the use of two images, namely, an image in the selection region 207 in the left-side region 701 and a contour extracted image. Hereinafter, a portion of a nucleus in an image is referred to as a nucleus region, a portion of cytoplasm surrounding the nucleus is referred to as a cytoplasm region, and a combined whole of the nucleus region and the cytoplasm region is referred to as a cell region.

First, in a nucleus region determination processing step S1401, a nucleus region is determined. Examples of methods thereof include the following method. With HE staining, since the inside of a nucleus is stained deep blue, whether or not a region is a nucleus region can be determined based on whether or not pixels in the selection region 207 positioned inside a corresponding closed region in the contour extracted image belong in a prescribed color gamut range at a certain ratio or more. The ratio and the color gamut used for the determination may be learned in advance using a plurality of samples.

Next, in a cytoplasm region determination processing step S1402, a cytoplasm region is determined. With HE staining, a cytoplasm is stained in pink. Therefore, in a similar manner to the nucleus region determination processing, whether or not a region is a cell region can be determined based on whether or not pixels in the selection region 207 positioned inside a corresponding closed region in the contour extracted image belong in a prescribed color gamut range at a certain ratio or more. Subsequently, a cytoplasm region is identified by subtracting a closed region that is assumed to be a nucleus region in step S1401 from the cell region. The ratio and the color gamut used for this determination may also be learned in advance using a plurality of samples.

When automatic processing is unable to achieve sufficient accuracy, a region may be determined with an intervention (assistance) by the user. In this case, after step S1402, a setting screen that enables the user to correct a contour, a nucleus region, or a cell region is displayed on the GUI.

Finally, in an N/C ratio calculation processing step S1403, an area of the nucleus region is divided by an area of the cytoplasm region obtained above to calculate an N/C ratio.

The N/C ratio calculation flow described above is merely an example and various modification and improvements can be made thereto.

(Advantages of Present Example)

As described above, in the present example, by decomposing a Z stack image into viewpoint images and performing edge extraction, a cell membrane, a cell boundary, and a boundary between a cell and a tube or a cavity which are useful when observing a sample can be clarified without having to modify optical systems or exposure conditions. Accordingly, a diagnosis supporting function which includes presenting images useful for diagnosis and calculating an N/C ratio can be realized.

Moreover, while the present example is configured so that the viewpoint-decomposed edge extraction/synthesis processing is executed when the execute button 708 is pressed, the viewpoint-decomposed edge extraction/synthesis processing may be executed every time the setting parameters shown in FIG. 7B and FIGS. 10A to 10C are modified. As a result, processing results are to be displayed in real-time in synchronization with modifications made to the setting parameters. In the case of this configuration, the setting items shown in FIG. 7B and FIGS. 10A to 10C may be deployed and arranged in a single setting screen. Such an implementation is also included in the scope of the present invention.

EXAMPLE 2

While Example 1 describes the extraction of an edge from a viewpoint image, Example 2 describes a method of generating an image with an enhanced edge from a viewpoint image. However, since there is only a slight difference from Example 1, a description will be given by replacing a part of the explanatory diagrams of Example 1.

Hereinafter, the term "edge extraction" contained in the names of the respective steps and respective components shown in FIGS. 7 to 10 will be replaced with "edge enhancement" and a difference thereof will be described.

An edge enhancing method used in the viewpoint edge enhancement processing S903 shown in FIG. 9 can be set on a viewpoint edge enhancement setting screen 1002 shown in FIG. 10B. Examples of edge enhancing methods that can be selected include an unsharp mask.

An unsharp mask is a type of an image sharpening method and realizes sharpening by subtracting an image that is a blurred original image from the original image and adding the difference image subjected to threshold processing and enhancement processing to the original image. An image U (X, Y) resulting from applying an unsharp mask to an original image I (X, Y) can be represented by the following expression.

$$U(X,Y)=I(X,Y)+\text{Amount}\times D(X,Y) \quad \text{[Expression 13]}$$

where D (X, Y)=0 if |D (X, y)|<Threshold.

I (X, Y) denotes the original image, D (X, Y) denotes a difference image, and Amount denotes an adaptation amount of the difference image to the original image.

The difference image D (X, Y) may be calculated by the following expression.

$$D(X,Y)=I(X,Y)-G(X,Y)**I(X,Y) \quad \text{[Expression 14]}$$

The difference image D (X, Y) is an image resulting from a subtraction of a blur image obtained by convolving a Gaussian function G (X, Y) into the original image I (X, Y) from the original image I (X, Y) (** is assumed to be a symbol representing a two-dimensional convolutional operation). Moreover, the Gaussian function G (X, Y) can be represented by the following expression.

$$G(X, Y) = \frac{1}{2\pi\sigma^2}\exp\left(-\frac{X^2+Y^2}{2\sigma^2}\right) \quad \text{[Expression 15]}$$

As described above, using an unsharp mask enables an amount of modification of the original image I (X, Y) to be controlled by adjusting a standard deviation σ of a Gaussian function, an adaptation amount Amount of a difference image, and a threshold Threshold, and an image with an enhanced edge can be generated.

In the present example, an unsharp mask is applied for each viewpoint image to generate an image with an enhanced edge. Appropriately setting the threshold Threshold enables an edge portion with high contrast to be further enhanced while leaving portions with relatively low contrast unmodified. As a result, an effect that cannot be realized by enhancement processing on an image at a focusing position can be produced.

In the viewpoint edge synthesized image generating step S904 shown in FIG. 9, viewpoint edge enhanced images of the respective viewpoints are synthesized and outputted.

On the viewpoint edge synthesis setting screen 1003 shown in FIG. 10C, a compositing method to be used when synthesizing the viewpoint edge extracted images can be selected in a similar manner to Example 1. When observing a viewpoint edge synthesized image, while it is preferable to have the contrast of an edge portion enhanced, the viewpoint edge synthesized image is more easily observed (less unnatural) when an appearance of portions other than the edge portion resembles that of an image at a focusing position. In order to obtain such an image, a weighting setting that approximates a three-dimensional blur of an original optical system such as a Gaussian blur may be selected on the viewpoint edge synthesis setting screen 1003.

The generated viewpoint edge synthesized image is displayed in the right-side region 702 of the window 700 in the image display processing step S804 shown in FIG. 8.

Moreover, while edge enhancement using an unsharp mask has been described in the present example, other methods may be used as long as an edge in a viewpoint image can be selectively enhanced. For example, an original image may be blurred using a blur function other than Gaussian blur to obtain a difference image. As the blur function, a nonlinear function or a function that varies depending on a viewpoint may be used in a similar manner to Example 1. In addition, the adaptation amount Amount of a difference image or the threshold Threshold with respect to the difference image may be varied depending on an image. Furthermore, by inputting an enhanced image generated using the present example to a known diagnosis supporting algorithm, an effect of improving a calculation accuracy of a quantitative evaluation value such as an N/C ratio can be achieved in a similar manner to Example 1.

As described above, according to the present example, an easily observable sample image in which a cell membrane, a cell boundary, and a boundary between a cell and a tube or a cavity are enhanced can be generated without performing imaging that involves switching among optical systems or modifying photographic conditions such as exposure. As a result, an effect of improving diagnostic efficiency of a doctor can be achieved.

EXAMPLE 3

In the present example, a method of performing edge extraction or edge enhancement more effectively and achieving calculation load reduction by obtaining a viewpoint that is calculated in advance from a Z stack image will be described.

In Examples 1 and 2 above, a method has been described in which the user sets a position of a viewpoint to be calculated during viewpoint decomposition setting (refer to FIG. 10A). However, if a direction of an edge included in an original image is known in advance, a viewpoint at which an edge is more readily extracted can be determined. In consideration thereof, in the present example, a direction of an edge included in an original image is estimated by analyzing a Z stack image, and a viewpoint for which a viewpoint image is to be generated is determined based on the estimated edge direction. Accordingly, edge extraction or edge enhancement can be performed more effectively and a reduction in calculation load by reducing the number of viewpoint images to be calculated can be expected.

Figure 15:
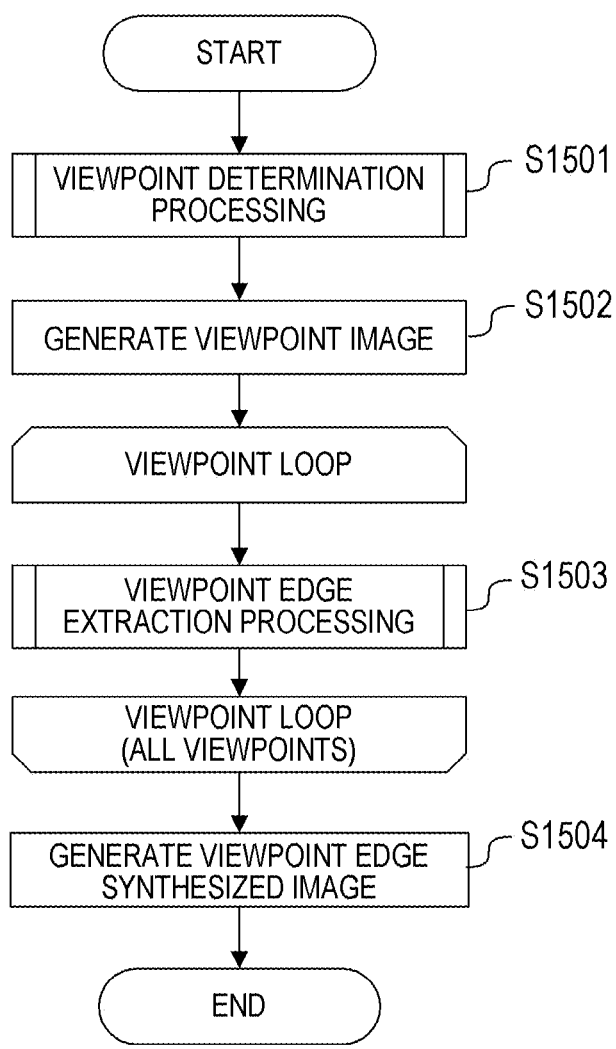
FIG. 15 is a flow chart showing the viewpoint—decomposed edge extraction/synthesis processing S802 according to Examples 3 and 4.

FIG. 15 shows a flow chart of viewpoint-decomposed edge extraction/synthesis processing (S802 in FIG. 8) according to the present example.

In a viewpoint determination processing step S1501, the Z stack image acquired in the Z stack image acquiring step S801 shown in FIG. 8 is analyzed to determine a viewpoint suitable for observation. Since processing of a viewpoint image generation step S1502 and thereafter are similar to the processing with the same names shown in FIG. 9, a description thereof will be omitted.

Figure 16:
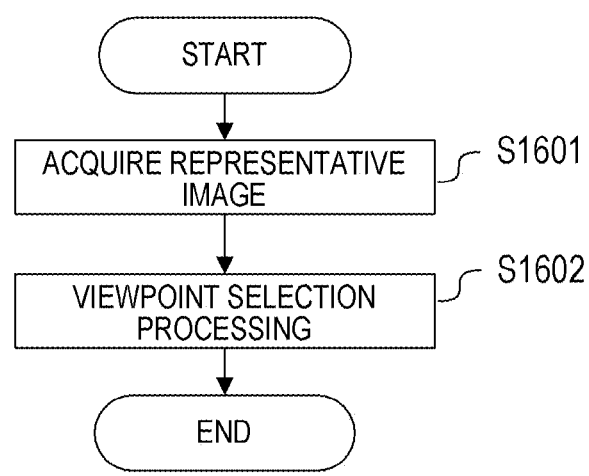
FIG. 16 is a flow chart showing viewpoint determination processing S1501 according to Examples 3 and 4.

Details of the viewpoint determination processing will be described. FIG. 16 is a flow chart showing internal processing of the viewpoint determination processing step S1501.

In a representative image acquiring step S1601, a representative image is acquired from the Z stack image. Subsequently, in a viewpoint selection processing step S1602, a direction of an edge in an image to be extracted or enhanced which exists in the representative image is estimated (detected) and a position of a viewpoint suitable for observation is selected based on the estimated (detected) edge direction.

In this case, a representative image refers to a single image which represents a feature of the Z stack image and which is used for obtaining an edge of an image to be extracted or enhanced with a smaller calculation load. Examples of a representative image include an image in which the subject is most in focus among the plurality of layer images that constitute the Z stack image, an all-in-focus image generated from the plurality of layer images, and reduced images of such images.

Methods of selecting an image in which the subject is most in focus include a method involving applying processing involving calculating a dispersion of pixel values in a prescribed rectangular region at each pixel on an entire image for each of the layer images and selecting an image having a maximum sum of dispersions over the entire image. Alternatively, known techniques in the field of automatic focusing as well as various other methods can be applied.

In addition, generation of an all-in-focus image can be realized by generating a viewpoint image in which a line-of-sight direction is conformed to an optical axis direction using the method according to Patent Literature 1. Alternatively, various known techniques can be applied including a select and merge method in which pixels with large variations in pixel value in a depth direction are selected from a Z stack image and merged.

Furthermore, when a reduced image already exists in a format in which a Z stack image is stored, the reduced image may be used as the representative image. For example, when each of the Z stack images is compression-encoded by JPEG2000, each of the Z stack images has already been subjected to a discrete wavelet transform. Therefore, by acquiring a low-frequency image component of the discrete wavelet transform and generating an image, the calculation load for generating a representative image can be reduced.

Figure 17:
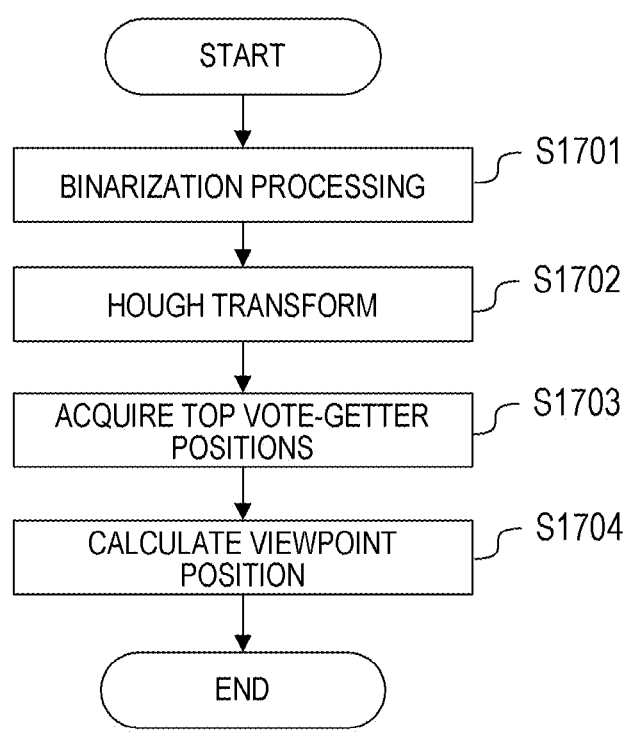
FIG. 17 is a flow chart showing viewpoint selection processing S1602 according to Example 3.

FIG. 17 is a flow chart showing internal processing of the viewpoint selection processing step S1602 according to the present example. In the present example, an edge is detected from an original image using an edge detecting method such as a Hough transform, a direction of the edge is obtained from the detection result, and information on the edge direction is used to determine a viewpoint.

In a binarization processing step S1701, binarization processing is performed on the representative image to obtain a binarized image. As the binarization processing, in addition to simple binarization processing that uses a fixed threshold, adaptive binarization processing in which a threshold is determined in accordance with image features may be used. In order to further improve edge detection accuracy, the wide variety of edge extraction processing described in Example 1 may be applied to the representative image before performing the binarization processing.

Subsequently, in a Hough transform step S1702, a Hough transform is performed on the binarized image. A Hough transform is a transform for transforming a straight line which may pass through a single point in an XY space into a locus in a different space (for example, a θρ space) and is capable of obtaining a straight line in the XY space or, in other words, a direction of an edge from a point with a large number of votes in a transform space. In the case of a θρ space, ρ denotes a length of a perpendicular lowered to a straight line in the XY space from an origin, and θ denotes an angle formed between the perpendicular and the X axis.

Next, in a top vote-getter position acquiring step S1703, the top Na-number of vote-getters in the θρ space of the Hough transform is selected and respective θρ coordinates thereof are acquired.

Subsequently, in a viewpoint position calculating step S1704, a position $(s_p, t_p)$ of a viewpoint is calculated based on the θ coordinate acquired in the top vote-getter position acquiring step S1703. Since the θ coordinate in the $θ_p$ space represents an angle of a direction perpendicular to a straight line (edge) in the XY space, θ is set as a polar angle $θ_p$ of the viewpoint. Next, a position of the viewpoint is calculated using values (for example, five) of a radius $r_p$ of a viewpoint determined in advance and the polar angle $θ_p$ of the viewpoint. Moreover, as the radius of the viewpoint, a fixed value determined in advance or a value determined based on a pixel pitch, a magnification, or a feature of the subject is set.

FIGS. 19A to 19D are schematic views of pathological samples. Calculation of a viewpoint position will now be described in a specific manner with reference to these drawings.

Figure 19A:
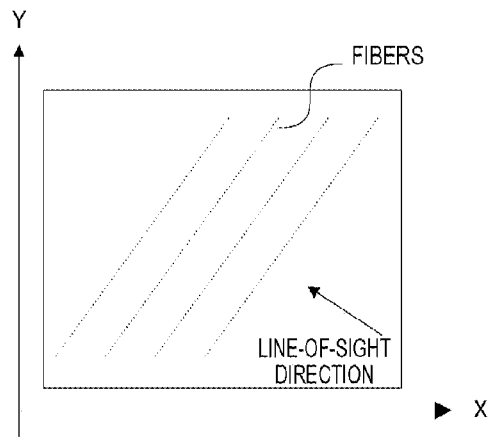
FIGS. 19A to 19D are schematic views showing representative images to which application is assumed in Examples 3 and 4.

FIG. 19A shows a representative image of a region having a strong image component in a particular direction such as a muscle fiber. For example, an angle perpendicular to a straight line of an edge is obtained as −30 degrees from a result of a Hough transform performed on the representative image shown in FIG. 19A and the angle is set as a polar angle of a viewpoint.

Moreover, in order to narrow down positions of viewpoints at which a variation in contrast of an edge is easily observed from the plurality of viewpoint positions obtained in the viewpoint position calculating step S1704, processing such as that described below may be additionally performed after step S1704.

Figure 19B:
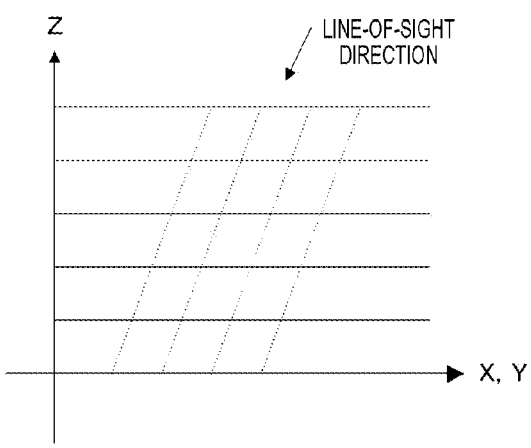

FIG. 19B is a schematic view of a cross section when a Z stack image is sliced in a direction of the polar angle described earlier. This diagram schematically shows an example in which the Z stack image is constituted by five layer images.

First, a position of a viewpoint is calculated based on a combination of radii of a plurality of viewpoints determined in advance and the Na-number of polar angles obtained in step S1704.

Next, a band-like region which has a constant width Δρ and which is centered on a straight line (edge) in an XY space corresponding to a coordinate on a θρ space of the Hough transform used when obtaining the polar angles of the viewpoints is cut out from the Z stack image. As a result, a Z stack image such as that shown in FIG. 19B is obtained. Next, for each viewpoint, an integrated image which integrates the band-like Z stack image described above along a line-of-sight direction (X, Y, Z)=(−s, −t, 1) obtained from the position of the viewpoint is created. Subsequently, a viewpoint position at which a dispersion of the integrated image is the largest is determined as a final viewpoint.

Moreover, when narrowing down positions of viewpoints, a calculation load can be suppressed by adopting the following configuration. First, two-dimensional data resulting from integrating the inside of the band-like region of the Z stack image in a direction perpendicular to the line-of-sight direction in the XY plane (corresponding to a fiber direction in FIG. 19A) is created. Subsequently, the integrated two-dimensional data is integrated in the line-of-sight direction. Finally, dispersion is calculated.

According to the processing described above, a list of viewpoints used for calculation is created.

Generating a viewpoint image from a viewpoint obtained as described above produces a viewpoint image in which an edge included in an image can be more enhanced than a viewpoint image in a direction determined mechanically regardless of features of the image (for example: polar angle 45×n degrees, where n=0 to 7; radius 0.25×m, where m=0 to 7). Accordingly, an effect of improving edge extraction performance can be obtained.

As shown, according to the configuration of the present example, a viewpoint suitable for observation can be determined for each observation object region and an effect of extracting/enhancing an edge with high accuracy with a small calculation load can be achieved.

EXAMPLE 4

In the present example, a method of determining a position of a viewpoint suitable for observation which differs from the viewpoint selection processing according to Example 3 will be described. In contrast to Example 3 in which direction estimation of an edge is performed based on an image feature that is an edge component included in an original image, in the present example, direction estimation of an edge is performed based on an image feature that is a positional relationship of the subject included in the original image.

Figure 19C:
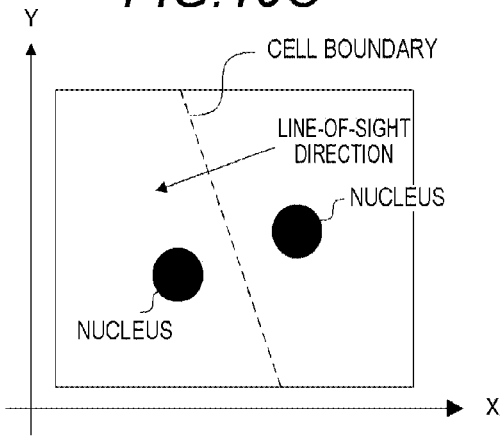

FIG. 19C is an example of a representative image of a region including a boundary between cells. A cell membrane, an intercellular substance (interstice), and the like of each cell exist at a cell boundary.

Unlike the image shown in FIG. 19A, an edge of a cell boundary (dashed line) is weak and directly detecting the edge with the method described in Example 3 is not easy. In this case, it can be estimated that a cell boundary passes between adjacent nuclei and that a direction of an edge of the cell boundary is approximately perpendicular to a direction that connects the two nuclei. Therefore, by selecting a direction which connects centers of adjacent nuclei as a line-of-sight direction and calculating a viewpoint image, the likelihood of detecting a cell boundary increases.

Figure 19D:
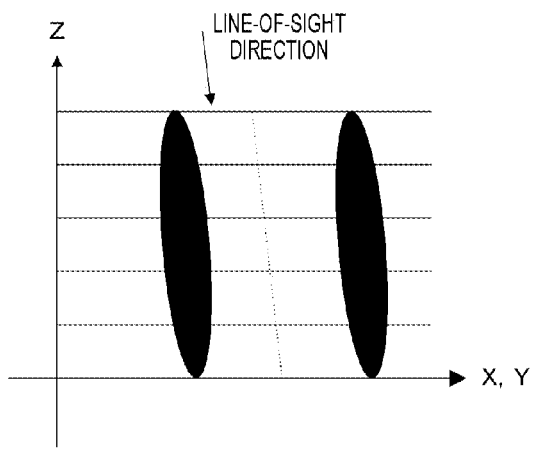

FIG. 19D is a schematic view of a cross section when a Z stack image is sliced in a direction of a straight line that connects adjacent nuclei. The schematic view of the cross section in the line-of-sight direction of the Z stack image shows that a position of a viewpoint suitable for observation of a cell boundary is obtained.

Figure 18:
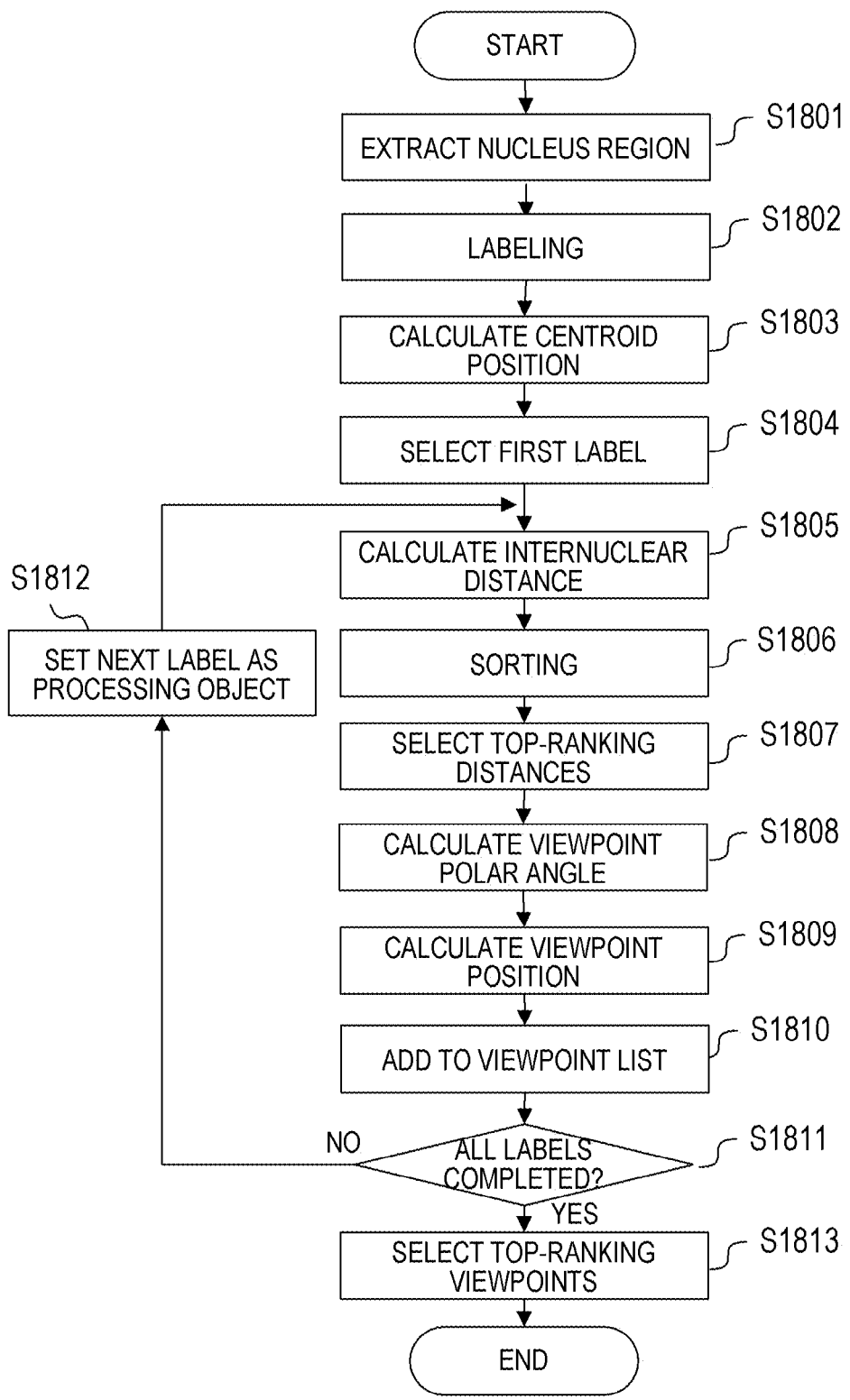
FIG. 18 is a flow chart showing the viewpoint selection processing S1602 according to Example 4.

FIG. 18 is a flow chart showing internal processing of the viewpoint selection processing step S1602 according to the present example.

In FIG. 18, first, in a nucleus region extracting step S1801, a region in which a cell nucleus exists is extracted from the acquired representative image.

Generally, with HE staining, since the nucleus is stained deep blue, a cell region can be extracted by performing adaptive binarization processing using a blue channel of a color image and subsequently filling internal holes using closing processing in which expansion/contraction is respectively and sequentially performed an equal number of times or the like. Besides this method, there are various known techniques for extracting a cell nucleus region and any method may be used. Moreover, desirably, noise elimination is performed which assumes that regions whose size is equal to or smaller than a certain size are not nuclei but noise and which eliminates such regions.

Subsequently, in a labeling step S1802, a number is assigned to each nucleus region extracted in step S1801. Labeling is processing involving classifying a plurality of pixel regions which are coupled to each other as a single group. Since labeling is a technique that is already well known, a description thereof will be omitted.

Next, in a centroid position calculating step S1803, a position of a centroid of each nucleus region to which a number had been assigned in step S1802 is calculated.

Steps S1804 to S1812 constitute loop processing for obtaining a direction of a straight line connecting adjacent nuclei from a nucleus region to which a label number has been assigned.

In step S1804, a first label number is selected as a processing object.

Subsequently, in an internuclear distance calculating step S1805, a distance between a centroid of a nucleus to which the label number of the processing object had been assigned and a centroid of a nucleus to which another label number had been assigned is obtained. In doing so, to prevent a calculation on a combination of label numbers for which a distance has already been calculated from being redundantly performed, internuclear distance calculations with respect to labels assigned numbers smaller than the label number that is the processing object may be omitted. In this case, as a calculation result, a previously obtained internuclear distance calculation result for the same combination is applied.

Next, in a sorting step S1806, using the values of distances obtained in step S1805, the combinations of labels are sorted in an ascending order (an order in which combinations with short distances are ranked high).

Subsequently, in a top-ranked distance selecting step S1807, a certain number Nc of label combinations are selected from the top of the result of sorting in an ascending order of distance. For example, assuming that there are four cells in a vicinity of a cell of a sample segment that is an observation object, Nc=4.

Next, in a viewpoint polar angle calculating step S1808, an angle formed between a straight line connecting centroids of nuclei and the X axis is obtained for each of the label combinations obtained in step S1807. As described above, since the angle of this straight line is an angle perpendicular to a cell boundary that is a boundary between two cells, the angle is set as a polar angle of a viewpoint.

Subsequently, in a viewpoint position calculating step S1809, a position of the viewpoint is calculated from the obtained polar angle of the viewpoint. In a similar manner to Example 3, a position (s, t) of the viewpoint is obtained from radii of a plurality of viewpoints within an aperture radius ra of a lens determined in advance and from the determined polar angle.

At this point, in order to further narrow down viewpoints, processing such as that described below may be additionally performed.

Specifically, first, a band-like region is cut out which has a constant width Δρ and which is centered on a straight line that passes through an intermediate position of centroids of two nuclei and that is perpendicular to the polar angle of the viewpoint. As a result, a Z stack image such as that shown in FIG. 19D is obtained. In this case, in order to eliminate an influence of nuclei, the Z stack image is desirably cut out in a range in which nuclei do not exist.

Next, an integrated image in which the Z stack image is added to a three-dimensional line-of-sight direction (X, Y, Z)=(−s, −t, 1) of each viewpoint is created, and a viewpoint at which a dispersion of the integrated image is the largest is selected. Due to the processing described above, viewpoints suitable for observation of a cell boundary can be narrowed down. Moreover, in a similar manner to Example 3, by integrating a line-of-sight direction in the XY plane (corresponding to a direction of a cell boundary in FIG. 19C) with the inside of the band-like region of the Z stack image in advance, a calculation load can be suppressed.

Subsequently, in a viewpoint list adding step S1810, positions of viewpoints obtained in the viewpoint position calculating step S1809 are added to a list. Moreover, a position of a viewpoint is not added when the same viewpoint position is already recorded on the list.

Next, in step S1811, a determination is made on whether or not processing has been completed on all label numbers. If not, a transition is made to step S1812 to set a nucleus region to which a next label number has been assigned as the processing object. When processing of all label numbers has been completed, a transition is made to a top-ranked viewpoint selecting step S1813.

The top-ranked viewpoint selecting step S1813 is processing for narrowing down the number of viewpoints in the viewpoint list. Even if there is a large number of cells in the selection region 207, the number of effective viewpoints can be kept within a certain range. Moreover, although not illustrated in the flow chart, the processing of step S1813 is not executed when the number of viewpoints in the viewpoint list is equal to or smaller than a prescribed number of viewpoints Nd.

First, in step S1813, a distribution of viewpoint positions in the viewpoint list is analyzed using a known technique such as clustering. With clustering, a parameter determined in advance is set. In addition, a centroid of each distribution is set as a representative viewpoint position, and the number of viewpoints in the distribution is counted for each representative viewpoint position. Next, the viewpoint positions are sorted in a descending order of the number of viewpoints in the distribution, and top Nd-number of viewpoint positions are selected. Accordingly, the number of viewpoints can be narrowed down.

This concludes the viewpoint selection processing based on a positional relationship of the nuclei of cells.

By outputting a position of a viewpoint obtained as described above in the viewpoint determination processing step S1501 in FIG. 15 and creating a viewpoint image in the subsequent viewpoint image generation step S1502, a contrast of a cell boundary that exists between cells can be increased and an extraction accuracy of the cell boundary can be improved.

According to the configuration of the present example, a cell membrane or a cell boundary with weak contrast can be extracted or enhanced without modifying optical systems or photographic conditions such as exposure. As a result, an effect of improving diagnostic efficiency of a doctor can be achieved.

EXAMPLE 5

In the present example, a description will be given on a method of improving diagnostic efficiency of a pathologist by automatically calculating a viewpoint position from which an observation is to be made and presenting the viewpoint position to the user using the viewpoint determination processing S1501 described in Examples 3 and 4.

Figure 20:
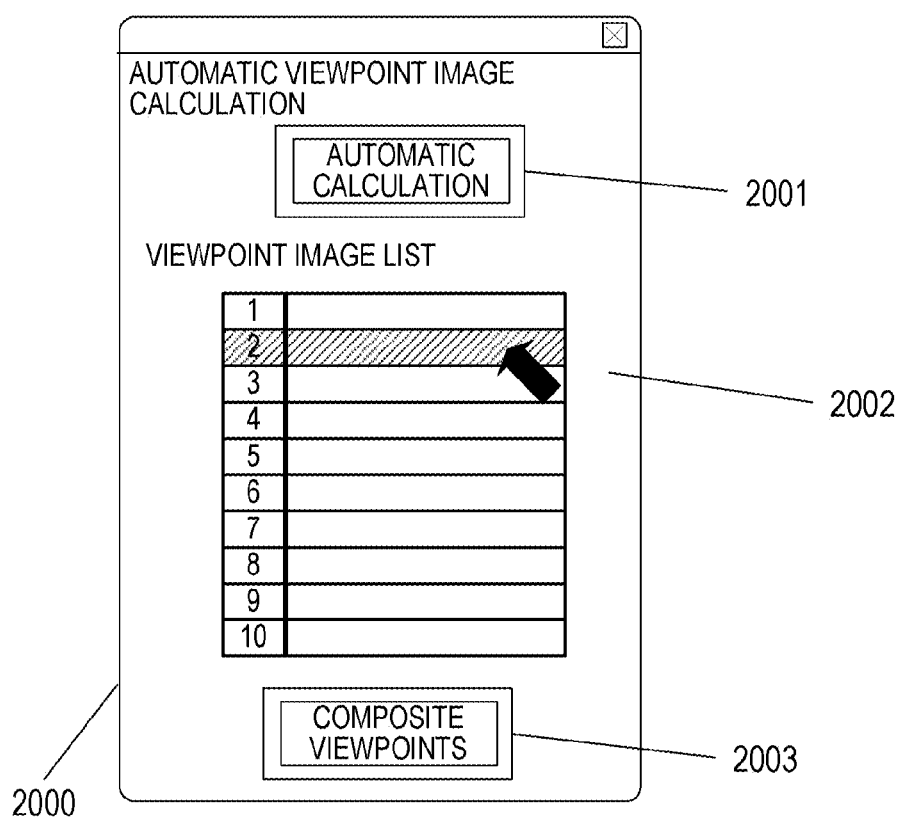
FIG. 20 is a diagram showing an example of a GUI of an automatic viewpoint image calculating function according to Example 5.

The following description will be given with reference to an automatic viewpoint image calculation setting screen shown in FIG. 20.

In the present example, in a similar manner to Example 1, the region 207 to be observed is first selected in the image display application and the extensions menu 208 is displayed.

Subsequently, when automatic viewpoint image calculation (not shown) is selected from the extensions menu 208, the new window 700 opens, an image in the region 207 is displayed in the left-side region 701, and a calculated viewpoint image is displayed in the right-side region 702. At this point, an automatic viewpoint image calculation setting screen 2000 shown in FIG. 20 is simultaneously displayed.

When an automatic calculation button 2001 in the setting screen 2000 is pressed, the viewpoint determination processing (S1501) and the viewpoint image generation processing (S1502) described in Examples 3 and 4 are executed and viewpoints suitable for observation are listed up in a viewpoint image list 2002.

When the user selects a desired viewpoint in the viewpoint image list using the mouse, a corresponding viewpoint image is displayed in the right-side region 702.

Moreover, the calculation of a viewpoint image or, in other words, the viewpoint image generation processing (S1502) may be executed when the user selects a desired viewpoint in the viewpoint image list. In this case, a viewpoint image of a viewpoint once selected by the user may be stored in a memory, and when the same viewpoint is next selected, the viewpoint image may be read from the memory and displayed without executing the viewpoint image generation processing.

In addition, besides displaying a viewpoint image, a result of applying the edge extraction processing or the edge enhancement processing described in Examples 1 and 2 to the viewpoint image may also be displayed.

Furthermore, even when the edge extraction processing or the edge enhancement processing described in Examples 1 and 2 is not performed, by selecting/compositing only viewpoint images with clear contrast, a contrast of an edge is expected to be higher than in a photographed image which combines images of various line-of-sight directions. Therefore, the user may select a plurality of viewpoint images in which a contrast of an observation object location is clear from the viewpoint image list and display a composite image of the plurality of selected viewpoint images in the right-side region 702. For example, a plurality of images are selected by pressing down the automatic calculation button 2001 to generate a viewpoint image list and subsequently selecting a check box (not shown) that is provided for each viewpoint image in the viewpoint image list 2002. Finally, a plural viewpoint compositing button denoted by reference numeral 2003 is pressed and a composite image of the viewpoint images is displayed in the right-side region 702 of the window 700. Moreover, intensity (pixel value) of the composite image may be divided by the number of images composited so that the intensity of the composite image does not greatly vary from intensity of the viewpoint images.

According to the configuration of the present example, by automatically calculating a viewpoint image suitable for observation for each region, a viewpoint image in a direction desired by a pathologist can be promptly displayed and an effect of improving diagnostic efficiency of the pathologist can be achieved.

EXAMPLE 6

In the present example, a configuration which further improves the effects of Examples 1 and 2 will be described.

In Example 1, a feature of a viewpoint image in that a boundary between substances with different transmittance in a sample is clearly visible has been described with reference to FIG. 6B. A viewpoint image has another distinctive feature in addition to the feature described above. That is, with a viewpoint image, an unevenness which varies along the line-of-sight direction on the XY plane is enhanced and a sample appears three-dimensional in a similar manner to an observed image under oblique lighting which is obtained by illuminating the sample from a partial region of a lighting fixture. With a viewpoint image, in a similar manner to an image created by oblique lighting, the greater an incline of the line-of-sight direction with respect to the optical axis direction or, in other words, the larger the observation angle $\varphi$ of a line of sight, the higher the contrast of the unevenness on a sample surface and the more three-dimensional the appearance of the sample surface.

(However, an image created by oblique lighting and a viewpoint image physically differ from each other. While an optical blur is created as a focusing position is modified in an image created by oblique lighting, a viewpoint image differs in that a depth of field remains extremely deep regardless of a modification in a focusing position. Moreover, while a viewpoint image varies in accordance with a Z position Zf of a Z stack image that is brought into focus, the variation is expressed by a translation in the XY direction).

In the present example, a configuration will be described in which an unevenness on a sample surface is effectively enhanced (or extracted) by taking the features of a viewpoint image described above into consideration in the viewpoint edge extraction (or enhancement) processing S903.

Hereinafter, a description will be given on a reason why the greater the incline of the line-of-sight direction with respect to an optical axis in a viewpoint image, the higher the contrast of the unevenness on the sample surface.

Figure 21:
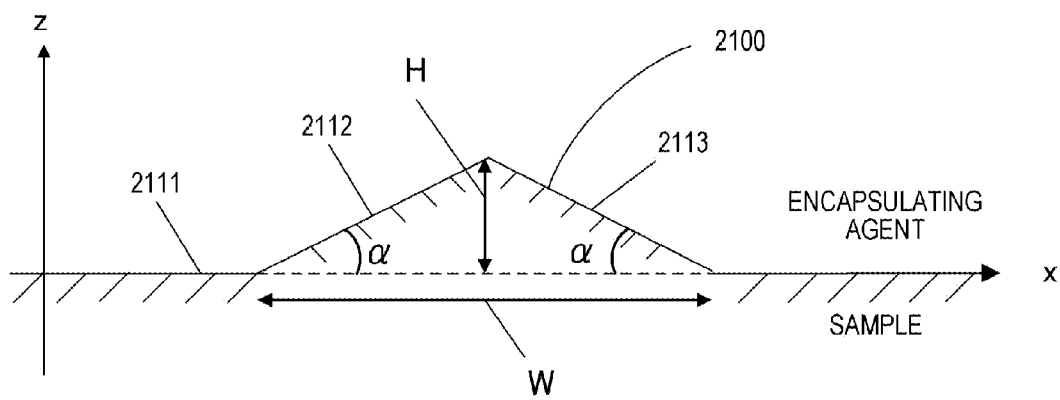
FIG. 21 is a schematic view showing unevenness existing on a surface of a pathological sample on a prepared slide.

Reference numeral 2100 in FIG. 21 represents a schematic view showing an unevenness existing on a surface of a pathological sample on a prepared slide. It is assumed that the unevenness on an xz plane shown in FIG. 21 also continues in a y direction that is a depth direction.

A pathological sample for tissue diagnosis is first fixed by paraffin, then sliced in a uniform thickness by a microtome, and finally stained. However, a pathological sample is not completely uniform. Unevenness attributable to tissue structure or components of substances exists at a boundary between a cell and a tube or a cavity, a boundary between a nucleus and cytoplasm, and the like, and an uneven structure such as that shown in FIG. 21 exists on a surface of the pathological sample.

(It should be noted that FIG. 21 presents a simplified model and an unevenness of an actual sample seldom includes a cusp such as that shown in FIG. 21. In addition, besides convex structures such as that shown in FIG. 21, there are also structures that are recessed toward the inside of a sample. Furthermore, since an optical distance varies when a substance with a different refractive index exists inside a sample even when the surface is smooth, a discontinuity in the refractive index inside a sample can be considered as a surface unevenness).

Moreover, with a real prepared slide, a transparent encapsulating agent is present between a cover glass and a sample. However, since a difference between a refractive index of an encapsulating agent and a refractive index of a sample is very small and does not have a significant impact, both refractive indexes will be assumed to be the same in the following description.

In FIG. 21, reference numeral 2111 denotes a plane with no unevenness, reference numeral 2112 denotes an inclined plane rising to the right, and reference numeral 2113 denotes an inclined plane dropping to the right. Inclination angles formed between the inclined planes 2112 and 2113 and the x axis are respectively α (α>0).

FIGS. 22A to 22C are schematic views showing intensity of scattered light at an observation angle φ on the planes 2111 to 2113 in FIG. 21. FIGS. 22A to 22C respectively represent scattering of light by the plane 2111 and the inclined planes 2112 and 2113. A circle circumscribing each plane represents intensity of scattered light in a scattering direction when the sample surface is assumed to be a perfect diffusion/transmission plane in terms of light-diffusing characteristics. A solid arrow line in the circle represents intensity of scattered light when observed from an angle that is inclined by φ from the optical axis (z axis). (Although an actual sample surface is not a perfect diffusion/transmission plane and has an intensity dependency in accordance with an incidence direction and/or an observation direction of light, the sample surface will be assumed to be a perfect diffusion/transmission plane for the sake of simplicity).

With a perfect diffusion/transmission plane, if intensity of light in a normal direction that is perpendicular to the plane is denoted by $I_0$ and an angle formed between an observation direction and a normal of the plane is denoted by δ, then intensity I(δ) of scattered light in a δ direction is expressed as $I(δ)=I_0 \cos δ$.

In FIGS. 22A to 22C, since angles δ formed between an observation direction and a normal of the planes may be respectively expressed as φ, φ+α, and α−α, intensities of the respective scattered light may be expressed as $I_0 \cos φ, I_0 \cos(φ+α),$ and $I_0 \cos(φ-α)$.

Moreover, if the inclination angle α is assumed to be positive at an inclined plane whose value of z increases when seen from the observation direction (a rising inclined plane) and the inclination angle α is assumed to be negative at an inclined plane whose value of Z decreases (a dropping inclined plane), the intensity of scattered light can be expressed as $I_0 \cos(φ-α)$ for both planes.

If a value obtained by dividing the intensity of scattered light in a direction of the observation angle φ of the inclined planes 2112 and 2113 with the intensity of scattered light in a direction of the observation angle φ of the plane 2111 is defined as a contrast C (φ, α), then the contrast may be represented by the following expression.

$$C(\phi, \alpha) = \frac{I_0\cos(\phi - \alpha) - I_0\cos(\phi + \alpha)}{I_0\cos\phi} = 2\tan\phi\sin\alpha \quad \text{[Expression 16]}$$

Values of the contrast C (φ, α) when φ and α are varied are shown in Table 1.

TABLE 1

| Observation angle φ [deg] | Inclined plane inclination angle | Contrast C(φ, α) |
|---|---|---|
| 0 | 1 | 0.0000 |
| 0 | 5 | 0.0000 |
| 0 | 10 | 0.0000 |
| 0 | 20 | 0.0000 |
| 10 | 1 | 0.0062 |
| 10 | 5 | 0.0307 |

TABLE 1-continued

| Observation angle φ [deg] | Inclined plane inclination angle | Contrast C(φ, α) |
|---|---|---|
| 10 | 10 | 0.0612 |
| 10 | 20 | 0.1206 |
| 20 | 1 | 0.0127 |
| 20 | 5 | 0.0634 |
| 20 | 10 | 0.1264 |
| 20 | 20 | 0.2490 |
| 30 | 1 | 0.0202 |
| 30 | 5 | 0.1006 |
| 30 | 10 | 0.2005 |
| 30 | 20 | 0.3949 |

Table 1 shows that when the observation angle φ is small, a contrast between the inclined planes 2112 and 2113 is low and is difficult to observe even when the inclination angle α is large, and as the observation angle φ increases, the contrast increases and is more easily observed even when the inclination angle α is small.

Next, a relationship between the inclination angle α of the surface unevenness 2100 and a spatial frequency of a pattern observed on a viewpoint image will be described.

If H denotes a height and W denotes a width of the surface unevenness 2100 of the pathological sample shown in FIG. 21, a relationship expressed as $W=2H/\tan α$ is satisfied. Let us assume that a pathological sample for tissue diagnosis has a thickness of approximately 4 μm and H is equal to 10% of the thickness or, in other words, 0.4 μm. In addition, let us assume that a limit contrast C that allows the existence of unevenness to be viewed when observing an image is 0.1.

Table 2 shows a result of widths W of unevenness obtained from minimum α (respectively, α=20, 10, and 5 degrees) at which the contrast C is 0.1 or higher for observation angles φ=10, 20, and 30 degrees in Table 1.

TABLE 2

| Observation angle φ [deg] | Inclined plane inclination angle α [deg] | Height of unevenness | Width of unevenness W [μm] |
|---|---|---|---|
| 10 | 20 | 0.4 | 2.20 |
| 20 | 10 | 0.4 | 4.54 |
| 30 | 5 | 0.4 | 9.14 |

Table 2 shows that the larger the observation angle φ, the more visible the unevenness even if the unevenness has a small inclination angle α.

Assuming that the surface unevenness of the pathological sample is periodic, a spatial frequency corresponding to the width W of the unevenness can simply be obtained by 1/W. Table 3 shows spatial frequencies for widths W [μm] of the unevenness when a sensor pixel pitch of 0.25 μm is assumed.

TABLE 3

| Width of unevenness W [μm] | Pixel conversion (0.25 um/pix) | Spatial frequency [lines/mm] |
|---|---|---|
| 2.20 | 8.79 | 455 |
| 4.54 | 18.15 | 220 |
| 9.14 | 36.58 | 109 |

Table 3 shows that, with an unevenness of a sample observed to have a contrast C of 0.1 or higher, the unevenness is in a region of relatively high frequency when the observation angle φ is small (10 degrees), and the unevenness is in a region of relatively low frequency when the observation angle φ is large (30 degrees).

Therefore, in the viewpoint edge extraction (enhancement) processing S903, edge extraction (enhancement) may be mainly performed on a high-frequency component (an image with a high spatial frequency) when the observation angle φ is small. On the other hand, when the observation angle φ is large, a range in which edge extraction (enhancement) is performed may be widened to include a lower frequency component (an image with a low spatial frequency) than in the case of a small observation angle φ. In other words, the larger the observation angle φ of a viewpoint image, the lower the frequency from which edge extraction (enhancement) may be performed. Accordingly, an unevenness of a sample surface can be effectively extracted (or enhanced) in accordance with features of a viewpoint image.

Next, a relationship between a polar angle θ of a viewpoint and a contrast of a surface unevenness will be described.

FIG. 21 is a diagram showing a case where a direction perpendicular to an edge of a surface unevenness (a direction of brightness variation) and a polar angle θ (θ=0) of a viewpoint are consistent with each other. If an angle formed between a direction perpendicular to the edge of the surface unevenness and the x axis is assumed to be an unevenness direction angle β, when the unevenness direction angle β and the polar angle θ are not consistent with each other, the surface unevenness 2100 is to be observed from an oblique direction. In this case, an apparent inclination angle α' of the inclined plane 2113 and the inclined plane 2112 in a direction opposite to the inclined plane 2113 as viewed from an observation direction having an angle expressed as polar angle θ-angle β can be calculated by $$\tan\alpha' = \frac{\tan\alpha}{1 + \tan(|\theta - \beta|)}. \quad \text{[Expression 17]}$$

Expression 17 shows that the apparent inclination angle α' is smaller than α and that the contrast C declines in accordance with a difference |θ−β| between the unevenness direction angle β and the polar angle θ. Conversely, the contrast is highest and a surface unevenness is most easily extracted when the unevenness direction angle β and the polar angle θ are consistent with each other. In addition, the contrast C is lowest (zero) when the difference |θ−β| between the unevenness direction angle β and the polar angle θ is 90 degrees.

(Edge Enhancement)

As described earlier, favorably, the larger the observation angle φ of the line-of-sight direction, the lower the frequency from which edge extraction (enhancement) processing is performed. In consideration thereof, in the present example, parameters of edge extraction (enhancement) processing are controlled so that a range of spatial frequencies in which an effect of edge enhancement (extraction) is obtained varies according to a magnitude of the observation angle φ (so that the larger the observation angle φ, the wider the range on a low-frequency side).

Hereinafter, a specific example will be described in which a method of controlling parameters is applied to edge enhancement processing using the unsharp mask described in Example 2.

In unsharp mask processing, the following relationship exists between MtfB(f) that represents an MTF (Modulation Transfer Function) of a spatially given blur and MtfU(f) that represents an MTF of a result of the unsharp mask processing.

$MtfU(f)=1+\text{Amount}\times(1-MtfB(f))$

The greater the spatially given blur, the closer MtfB(f) is to an origin side (a low-frequency side) of a frequency axis, and MtfU(f) representing a result of the unsharp mask processing can be significantly enhanced from the low-frequency side. In other words, the greater the spread of blur due to a blur function (the Gaussian function G (X, Y) represented by Expression 14) used in the unsharp mask processing, the greater the enhancement that can be made on the low-frequency side.

Specifically, in the present example, the following blur function is used in place of the blur function represented by Expression 15.

$$G(X, Y) = \frac{1}{2\pi\sigma_X\sigma_Y}\exp\left(-\left(\frac{X_\theta^2}{2\sigma_X^2} + \frac{Y_\theta^2}{2\sigma_Y^2}\right)\right), \quad \text{[Expression 18]}$$

where
$X_\theta = X \cos\theta + Y \sin\theta$, $Y_\theta = -X \sin\theta + Y \cos\theta$.

In Expression 18, θ corresponds to a polar angle of a viewpoint, and $\sigma_X$ and $\sigma_Y$ are standard deviations which respectively represent spreads of the blur in the X axis direction and the Y axis direction.

A correspondence between $\sigma_X$, $\sigma_Y$ and the observation angle φ is shown below.

$\sigma_X = f(\varphi) = \sigma_{X0} + c\times\tan\varphi$ $\sigma_Y = \sigma_{Y0}$ \quad [Expression 19]

where c, $\sigma_{X0}$, and $\sigma_{Y0}$ are prescribed constants. $\sigma_X$ may be a function f(φ) of the observation angle φ. It should be noted that the expression above is simply an example and other functions can also be used.

By associating the blur function used by the unsharp mask with a polar angle θ and an observation angle φ of a viewpoint in an actual image pickup system using Expression 19, the function G (X, Y) represented by Expression 18 becomes a blur function that varies in accordance with the polar angle θ and the observation angle φ of the actual image pickup system.

Figure 24:
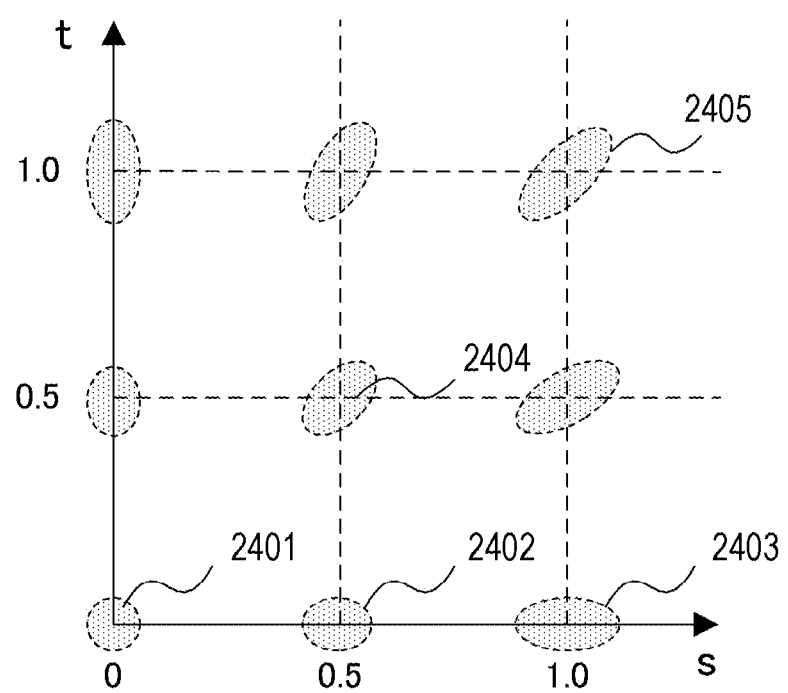
FIG. 24 is a schematic view of blur functions which are used in an unsharp mask and which vary depending on a viewpoint position.

FIG. 24 shows a schematic view of blur functions which are generated according to Expression 18 and which vary depending on a viewpoint position. Blur functions 2401, 2402, and 2403 show that a radius $\sigma_X$ of the blur becomes longer in accordance with a magnitude of a radius $(s^2+t^2)^{1/2}$. In addition, blur functions 2401, 2404, and 2405 show that a long side of the blur rotates by the polar angle θ of the viewpoint.

In other words, by enhancing a viewpoint image with an unsharp mask using the blur function described above, an edge of a brightness variation in an $X_\theta$ axis direction is enhanced from a lower frequency when the viewpoint image has a larger observation angle φ.

Figure 25:
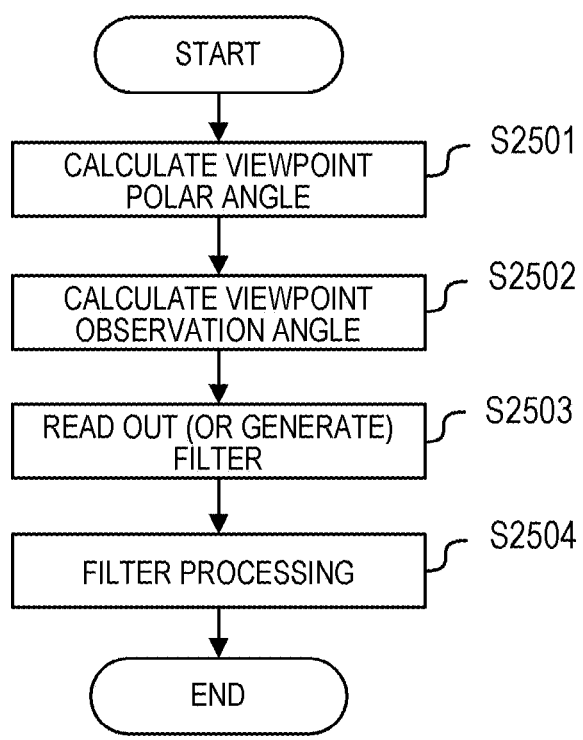
FIG. 25 is a flow chart showing internal processing of the viewpoint edge extraction processing S903 according to Example 6.

FIG. 25 is a flow chart showing internal processing of the viewpoint edge extraction processing S903 according to the present example.

First, in a viewpoint polar angle calculating step S2501, a viewpoint polar angle θ is calculated using a viewpoint (s, t) according to Expression 3.

Subsequently, in a viewpoint observation angle calculating step S2502, an observation angle φ is calculated using the viewpoint (s, t), a sensor pixel pitch (an image sampling pitch) ΔX in the X direction, and a movement interval (a layer image interval) ΔZ in the Z direction according to Expression 5.

Next, in a filter reading (generating) step S2503, a filter suitable for a viewpoint image is read out (or generated). In S2503, first, the observation angle φ calculated in S2502 is substituted into Expression 19 to obtain $\sigma_X$ and $\sigma_Y$. Next, using values of the polar angle θ calculated in S2501 and $\sigma_X$ and $\sigma_Y$ calculated in S2502 as indexes, data of a corresponding blur function is read out from a table in which blur functions calculated in advance using Expression 18 have been registered. Alternatively, values of the polar angle θ and $\sigma_X$ and $\sigma_Y$ may be substituted into Expression 18 to generate (calculate) a blur function.

Subsequently, in a filter processing step S2504, using the blur function read out (or calculated) in S2503, edge enhancement processing by the unsharp mask shown in Expressions 14 and 13 is performed to generate a viewpoint edge enhanced image.

Next, internal processing for improving an effect of the filter processing step S2504 will be described.

Although the edge enhancing method using an unsharp mask described in Example 2 is highly effective while only requiring a small calculation load and is therefore widely used, there is a problem that high-frequency noise contained in an image may become conspicuous. Hereinafter, methods of suppressing high-frequency noise with respect to an unsharp mask will be described.

(Noise Suppression 1) Dynamic Threshold Processing

Table 1 shows that, even at the same inclination angle α, a contrast of an observed surface unevenness differs according to the observation angle φ. Therefore, the threshold Threshold in Expression 13 may be made variable depending on the observation angle φ. In other words, the threshold Threshold that is a parameter of edge processing is modified so that the larger the observation angle φ, the greater the effect of suppressing high-frequency noise. By setting a small threshold Threshold when the observation angle φ is small and setting a large threshold Threshold when the observation angle φ is large, surface unevenness and noise can be properly separated from each other for each viewpoint and noise can be suppressed.

For example, the threshold Threshold may be set according to the following expression.

$$\text{Threshold}(s, t) = T_0 \times \tan\phi = T_0 \times \frac{\Delta X}{\Delta Z}\sqrt{s^2 + t^2} \quad \text{[Expression 20]}$$

where $T_0$ is a prescribed constant.

(Noise Suppression 2) Use of Brightness Component in Threshold Processing

As described with reference to FIG. 22, when there is unevenness on a sample surface, intensity of scattered light varies depending on the observation angle φ. Therefore, with the threshold processing represented by Expression 13, noise can be further suppressed by performing calculations according to brightness instead of performing a calculation for each color component and sharing zero and non-zero positions of a difference image among the respective colors.

An expression of unsharp mask processing that adopts such threshold processing is given below.

$$Uc(X, Y) = Ic(X, Y) + \text{Amount} \times Dc(X, Y) \times BL(X, Y) \quad \text{[Expression 21]}$$
$$Dc(X, Y) = Ic(X, Y) - G(X, Y) ** Ic(X, Y)$$
$$BL(X, Y) = \begin{cases} 0, & |DL(X, Y)| < \text{Threshold} \\ 1, & |DL(X, Y)| \geq \text{Threshold} \end{cases}$$
$$DL(X, Y) = L(X, Y) - G(X, Y) ** L(X, Y)$$

A subscript c denotes a color component, and Ic (X, Y), Dc (X, Y), and Uc (X, Y) respectively represent an image, a difference image, and an unsharp mask-applied image for each color component c. L (X, Y) represents a brightness component obtained from the image color component Ic (X, Y). In addition, DL (X, Y) represents a difference image obtained from brightness L (X, Y) and a blur function G (X, Y), and BL (X, Y) represents a binary image obtained by comparing an absolute value of DL (X, Y) with the threshold Threshold. Amount denotes an adaptation amount that represents a degree of edge enhancement in a similar manner to Expression 13. ** is a symbol denoting a two-dimensional convolutional operation.

(Noise Suppression 3) Advance Application of Low-Pass Filter

In addition, as another noise suppression method, favorably, a difference image is calculated after applying a low-pass filter to an original image. Specifically, in the calculation of Dc (X, Y) and DL (X, Y) in Expression 21, $$Dc(X,Y)=LP(Ic(X,Y))-G(X,Y)**LP(Ic(X,Y))$$

$$DL(X,Y)=LP(L(X,Y))-G(X,Y)**LP(L(X,Y)) \quad \text{[Expression 22]}$$

is used, where LP ( ) denotes a function representing the application of a low-pass filter on an image. As the low-pass filter, various blur functions such as a Gaussian function can be applied. In addition, as LP ( ), noise reduction processing such as a median filter, a ∈ filter, or a bilateral filter can be applied.

Due to the low-pass filter processing, a high-frequency component is suppressed in Dc (X, Y) and DL (X, Y) and enhancement of a high-frequency component in an unsharp mask result image is suppressed. Among the unevenness on the sample surface, since the unevenness of a cell boundary of interest or a boundary of interest between a cell and a tube or a cavity has a relatively large structure and a low spatial frequency, the impact of the low-pass filter processing described above is minimal.

Moreover, various high-frequency noise eliminating methods and improvement methods are proposed with respect to an unsharp mask besides those described above, and applying such methods to the filter processing step S2504 is also included in the scope of the present invention.

(Weighting According to Viewpoint Position)

Subsequently, in the viewpoint edge synthesized image generating step S904, the plurality of viewpoint images calculated in the viewpoint edge extracting step S903 are collected and a viewpoint edge synthesized image is created using weighting specified on the setting screen 1003. The weighting indicates which viewpoint edge extracted image among the plurality of viewpoint edge extracted images is to be emphasized in the synthesis.

A blur of the viewpoint edge synthesized image can be controlled by controlling weighting. In doing so, when selecting "Gaussian blur" on the setting screen 1003, since a Gaussian blur closely resembles a blur of a general image pickup system, a natural appearance is produced. However, since the larger the observation angle φ, the smaller the weighting, intensity of an edge-enhanced location weakens and observation of a difference becomes difficult.

As already shown in FIG. 1, the larger the observation angle φ, the higher the contrast in which an unevenness on a sample surface can be observed. Therefore, among the viewpoint edge enhanced images, if an original viewpoint image component (I (X, Y) in Expression 13) can be synthesized at a blur resembling the blur of the image pickup system and a viewpoint edge enhanced component (D (X, Y)) can be synthesized while suppressing a decrease in intensity as compared to the blur of the image pickup system, the unevenness on the sample surface can be observed more easily.

In consideration thereof, when generating an edge synthesized image using a method in which the larger the observation angle φ of an edge extracted image, the smaller the weight when compositing the edge extracted image, a greater degree of edge enhancement (extraction) may be set in advance to a viewpoint image with a larger observation angle φ when obtaining edge extracted images. Accordingly, when generating an edge synthesized image, a weight and a degree of edge enhancement (extraction) cancel out each other and a decline in an edge enhanced component can be suppressed.

Let us assume that, when synthesizing viewpoint image components, a weight of a light beam passing through a viewpoint (s, t) is represented by the Gaussian blur expression below.

$$G(s, t) = \frac{1}{2\pi\sigma^2} \exp\left(-\frac{s^2 + t^2}{2\sigma^2}\right) \quad \text{[Expression 23]}$$

where σ denotes a standard deviation representing a spread of blur in a viewpoint edge synthesized image.

In this case, an adaptation amount Amount of an unsharp mask is controlled as follows according to the viewpoint position (s, t). $A_0$ denotes a prescribed constant.

$$\text{Amount}(s, t) = A_0 \times \exp\left(\frac{s^2 + t^2}{2\sigma^2}\right) \quad \text{[Expression 24]}$$

Consequently, while a weight of the original viewpoint image component is the Gaussian blur represented by Expression 23, a weight of the viewpoint edge enhanced component (D (X, Y)) is obtained by a multiplication of Expression 23 and Expression 24. As a result, the portion of the viewpoint position (s, t) is canceled and synthesis can be achieved at a constant ratio that is independent of a viewpoint.

Hereinafter, a procedure for applying the processing described above to the filter processing step S1203 or S2504 will be described.

First, based on setting information regarding weighting in the viewpoint edge synthesis setting 1003, the adaptation amount Amount dependent on a viewpoint is obtained using Expression 24. Examples of setting information regarding weighting include a function representing a shape of weighting such as a Gaussian blur and a value of the standard deviation σ that represents a spread of a blur.

Subsequently, according to Expression 13 or Expression 21, an edge is enhanced using the adaptation amount Amount (s, t) that is dependent on a viewpoint. Accordingly, an edge can be made more identifiable in a viewpoint edge synthesized image while retaining a feel of the original image. Moreover, Expression 18 is simply an example and various other functions can be set.

While edge enhancement using an unsharp mask has been described above, similar processing can also be applied to edge extraction. D (X, Y) in Expression 14 (or Dc (X, Y) and DL (X, Y) in Expressions 21 and 22) that is obtained in an unsharp mask calculation process represent an image for which an edge is extracted and may be considered an edge extracted image.

Therefore, in the filter processing S2504, edge extraction can be achieved by outputting an image obtained by subtracting the original image from an application result of Expression 14 or an unsharp mask application result.

Moreover, in a similar manner to Example 1, by obtaining an absolute value or a square value with respect to a result of the edge extraction described above, nonlinearity can be further increased and an edge in a viewpoint edge synthesized image can be further enhanced.

(Advantages of Present Example)

As described above, in the present example, by controlling a frequency band, intensity, noise reduction conditions, and the like at which edge extraction or edge enhancement is to be performed using a polar angle θ and an observation angle φ of a viewpoint, excessive enhancement of an entire viewpoint image can be suppressed and an surface unevenness can be efficiently enhanced. As a result, since a cell membrane, a cell boundary, a boundary between a cell and a tube or a cavity, and the like having surface unevenness can be enhanced, a diagnosis supporting function such as presentation of an image useful for diagnosis and calculation of an N/C ratio can be realized.

EXAMPLE 7

In the present example, a method of generating an viewpoint edge image using a filter for edge enhancement (or edge extraction) generated using a blur function (a three-dimensional blur model) with a greater blur than a blur function (a three-dimensional blur model) of an image pickup system used to photograph the subject.

Figure 26A:
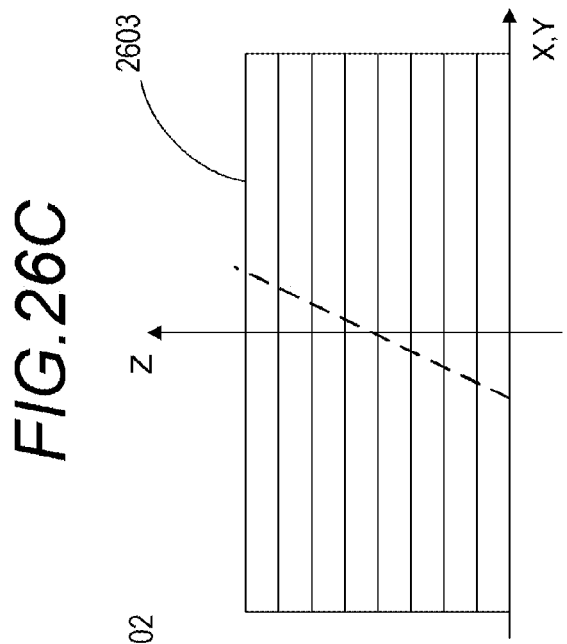
FIGS. 26A to 26C are schematic views showing a three-dimensional blur model used in Example 7.
Figure 26B:
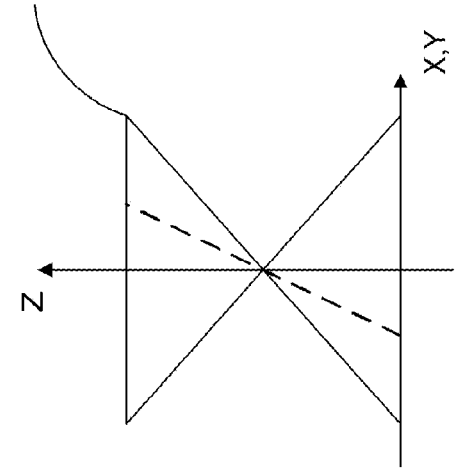
Figure 26C:
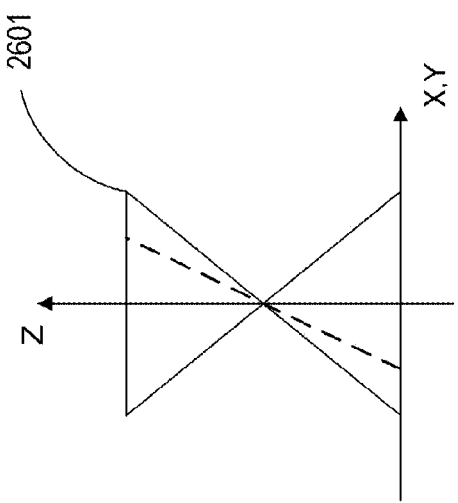

Reference numeral 2601 in FIG. 26A represents a three-dimensional blur of an image pickup system in an orthogonal coordinate system (XYZ) or a three-dimensional blur that is closest to the three-dimensional blur of the image pickup system, and reference numeral 2602 in FIG. 26B represents a three-dimensional blur having a blur equal to or greater than 2601. Reference numeral 2603 in FIG. 26C represents a group of out-of-focus blurred images (a Z stack image) acquired by the image pickup system. Moreover, since the three-dimensional blur 2602 is used for the purpose of edge enhancement or edge extraction, hereinafter, the three-dimensional blur 2602 will also be referred to as a three-dimensional blur for edge processing.

The three-dimensional blurs 2601 and 2602 are represented by the following Gaussian blur expression using a blur radius R at a prescribed Z position at a distance D from a focusing position (a Z position with minimum blur).

$$G(X, Y) = \frac{1}{\pi R^2} \exp\left(-\frac{X^2 + Y^2}{R^2}\right) \quad \text{[Expression 25]}$$

where R=√2σ (σ denotes a standard deviation of a Gaussian distribution).

If a blur radius of the three-dimensional blur 2601 is denoted by $R_{b1}$ and a blur radius of the three-dimensional blur 2602 is denoted by $R_{b2}$, then $R_{b2} \geq R_{b1}$ holds true.

A viewpoint image $a_{s,t}$ (X, Y) that is viewed from a viewpoint (s, t) can be obtained by deconvoluting an integration value $b_{s,t}$ (X, Y) of a Z stack image 2603 in a same line-of-sight direction with an integration value $c_{s,t}$ (X, Y) of the three-dimensional blur 2601 of the image pickup system in a same line-of-sight direction. (A corresponding description is given in section 3.3 of Non-Patent Literature 2 ("2) With 2D Filters Simply Combining Multi-Focus Images" of Non-Patent Literature 4). As shown in FIG. 7 of Non-Patent Literature 2 (FIG. 6 of Non-Patent Literature 4), a relationship in which an group of integrative photographed images g (X, Y, Z) is obtained by convoluting a filter h (X, Y, Z) on real space information f (X, Y, Z) is satisfied regardless of an integration in a line-of-sight direction).

This relationship is represented by the following expression.

$$A_{s,t}(u,v) = B_{s,t}(u,v) / C_{s,t}(u,v) \qquad \text{[Expression 26]}$$

where $A_{s,t}$ (u, v), $B_{s,t}$ (u, v), and $C_{s,t}$ (u, v) are respectively Fourier transforms of $a_{s,t}$ (X, Y), $b_{s,t}$ (X, Y), and $c_{s,t}$ (X, Y), and u and v are respectively frequency coordinates corresponding to variations in the X and Y directions.

Next, when denoting an integration value in a same line-of-sight direction of the three-dimensional blur 2602 for edge processing as $c_{s,t}'$ (X, Y), properties of an image $a_{s,t}'$ (X, Y) that is obtained by deconvoluting $b_{s,t}$ (X, Y) with $c_{s,t}'$ (X, Y) will be considered. The image $a_{s,t}'$ (X, Y) can be represented by the following expression.

$$A'_{s,t}(u,v) = B_{s,t}(u,v) / C'_{s,t}(u,v) \qquad \text{[Expression 27]}$$

where $A_{s,t}'$ (u, v) and $C_{s,t}'$ (u, v) are respectively Fourier transforms of $a_{s,t}'$ (X, Y) and $c_{s,t}'$ (X, Y).

Expression 27 can be modified as follows.

$$A'_{s,t}(u,v) = \frac{B_{s,t}(u,v)}{C_{s,t}(u,v)} \times \frac{C_{s,t}(u,v)}{C'_{s,t}(u,v)} = A_{s,t}(u,v) \times \frac{C_{s,t}(u,v)}{C'_{s,t}(u,v)} = A_{s,t}(u,v) \times E_{s,t}(u,v) \qquad \text{[Expression 28]}$$

where $$E_{s,t}(u,v) = \frac{C_{s,t}(u,v)}{C'_{s,t}(u,v)}. \qquad \text{[Expression 29]}$$

Expression 28 shows that the image $a_{s,t}'$ (X, Y) is an image resulting from the original viewpoint image $a_{s,t}$ (X, Y) being processed by a frequency filter represented by Expression 29.

Since the three-dimensional blur 2602 for edge processing has a blur equal to or greater than the three-dimensional blur 2601, a comparison of respective line-of-sight direction integration values $c_{s,t}'$ (X, Y) and $c_{s,t}$ (X, Y) thereof shows that the blur of $c_{s,t}'$ (X, Y) is greater. Since $c_{s,t}'$ (X, Y) and $c_{s,t}$ (X, Y) share a same integration value, a direct current component of $E_{s,t}$ (u, v) is 1. While properties differ according to viewpoint and frequency, the image has an edge enhancing property as a whole, and the greater the blur of $c_{s,t}'$ (X, Y), the stronger the appearing edge enhancing property.

Figure 27:
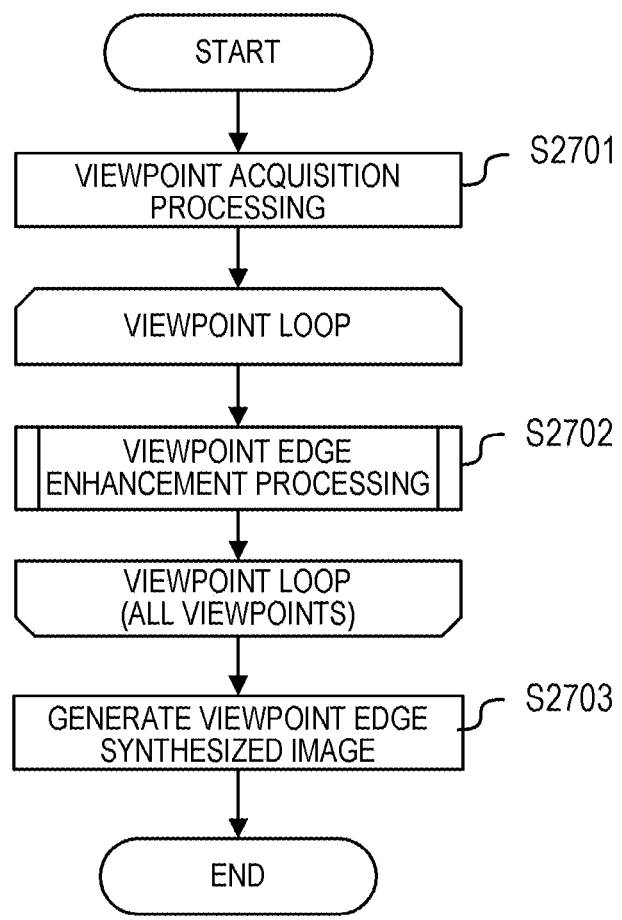
FIG. 27 is a flow chart showing the viewpoint—decomposed edge extraction/synthesis processing S802 according to Example 7.

FIG. 27 is a flow chart showing internal processing of the viewpoint-decomposed edge extraction/synthesis processing S802 according to the present example. Unlike in Example 1, the viewpoint image generation step S902 is not required. Hereinafter, a processing flow will be described.

First, in a viewpoint acquisition processing step S2701, positional information of a viewpoint necessary for generating an edge-enhanced or edge-extracted viewpoint image is acquired. Since contents of processing are similar to the viewpoint acquisition processing step S901, a description will be omitted.

Next, in a viewpoint edge enhancing step S2702, edge enhancement processing is performed based on the viewpoint edge extraction setting (705). Details will be given later. Moreover, when there are a plurality of viewpoints, the processing is executed for each of the viewpoints in a similar manner to FIG. 9.

Finally, in a viewpoint edge synthesized image generating step S2703, based on the viewpoint edge synthesis setting (706), the viewpoint edge enhanced images generated in step S2702 are composited to generate a viewpoint edge synthesized image. Since contents of processing are similar to the viewpoint edge synthesized image generating step S904, a description will be omitted.

Figure 28:
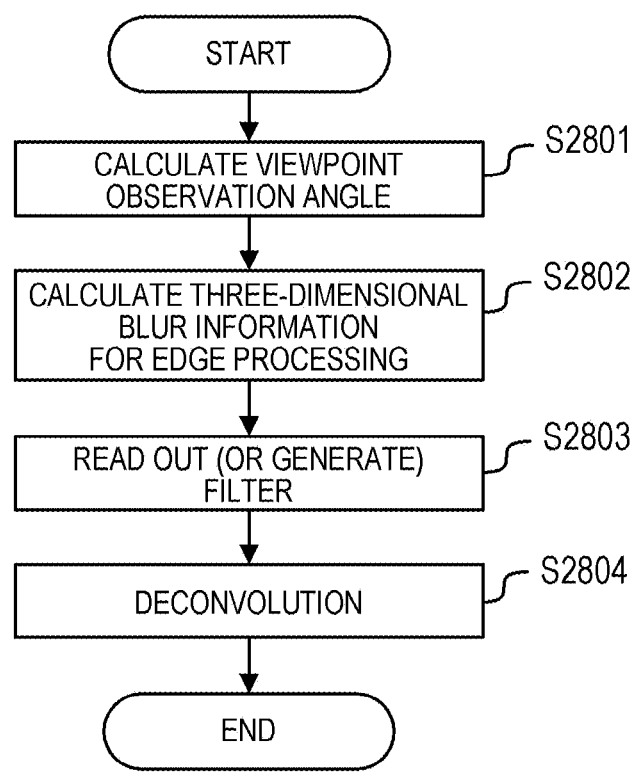
FIG. 28 is a flow chart showing internal processing of viewpoint edge extraction processing S2702.

FIG. 28 is a flow chart showing internal processing of the viewpoint edge enhancing step S2702.

First, in a viewpoint observation angle calculating step S2801, an observation angle φ is calculated using a viewpoint (s, t), a sensor pixel pitch (an image sampling pitch) ΔX in the X direction, and a movement interval (a layer image interval) ΔZ in the Z direction according to Expression 5.

Next, in a three-dimensional blur-for-edge processing information calculating step S2802, information (a blur radius $r_{b2}$ per unit distance) on a three-dimensional blur for edge processing is obtained using information (a blur radius $r_{b1}$ per unit distance) on a three-dimensional blur of a photographed image and the observation angle φ calculated in S2801. An example of a calculating method is shown below.

$$r_{b2} = (1 + C \times \tan \varphi) \times r_{b1} \qquad \text{[Expression 30]}$$

where c denotes a prescribed constant. The value of the constant c can also be set as a part of intensity of edge enhancement on the viewpoint edge extraction setting screen 1002.

According to Expression 30, the larger the observation angle φ (an angle formed between an optical axis direction and a line-of-sight direction), the larger the size (the blur radius $r_{b2}$) of the three-dimensional blur for edge processing. Moreover, when a blur radius $R_{b1}$ at a distance D is inputted as the information on the three-dimensional blur of a photographed image, the blur radius $r_{b1}$ per unit distance can be calculated by $r_{b1} = R_{b1}/D$.

Next, in a filter reading (filter generating) step S2803, a Fourier transform $c'_{s,t}$ (u, v) of an integration value of the three-dimensional blur 2602 for edge processing in the line-of-sight direction is acquired. When $c'_{s,t}$ (u, v) calculated in advance is stored in the storage device 130 or the main memory 302, based on the information ($r_{b2}$) on the three-dimensional blur for edge processing obtained in S2802 and the number of layers in the Z stack image, corresponding data is read out. Alternatively, $c'_{s,t}$ (u, v) may be obtained by calculating a three-dimensional blur from the information ($r_{b2}$) on the three-dimensional blur for edge processing and the number of layers in the Z stack image and subjecting an integration in the line-of-sight direction to Fourier transform. Moreover, a calculation amount may be reduced by storing $c'_{s,t}(u, v)^{-1}$ in the storage device 130 or the main memory in advance and reading out $c'_{s,t}(u, v)^{-1}$ in step S2803.

With the image generating apparatus 100, in order to calculate a viewpoint image at high speed from a photographed image having various out-of-focus blurs, Fourier transforms of an integration value of a plurality of three-dimensional blurs (for example, Gaussian blurs with different radii R) or an integration value of three-dimensional blurs at a plurality of viewpoints are calculated in advance and stored in the storage device 130 or the main memory 303. Therefore, a filter for edge enhancement need not be newly provided.

Subsequently, in a deconvoluting step S2804, first, an integration value $b_{s,t}(X, Y)$ of an integration of the Z stack image 2603 in a line-of-sight direction from the viewpoint (s, t) is obtained. Next, a Fourier transform $B_{s,t}(u, v)$ thereof is calculated. Subsequently, using $c'_{s,t}(u, v)$ obtained in step S2803, $A'_{s,t}(u, v)$ that is a Fourier transform of a viewpoint edge enhanced image is obtained according to Expression 27. Finally, by subjecting $A'_{s,t}(u, v)$ to an inverse Fourier transform, $a'_{s,t}(X, Y)$ that is a viewpoint edge enhanced image is obtained.

According to the processing described above, a viewpoint edge enhanced image can be generated in which the larger the observation angle $\varphi$ of the viewpoint, the higher the degree of edge enhancement in the viewpoint image.

Figure 29:
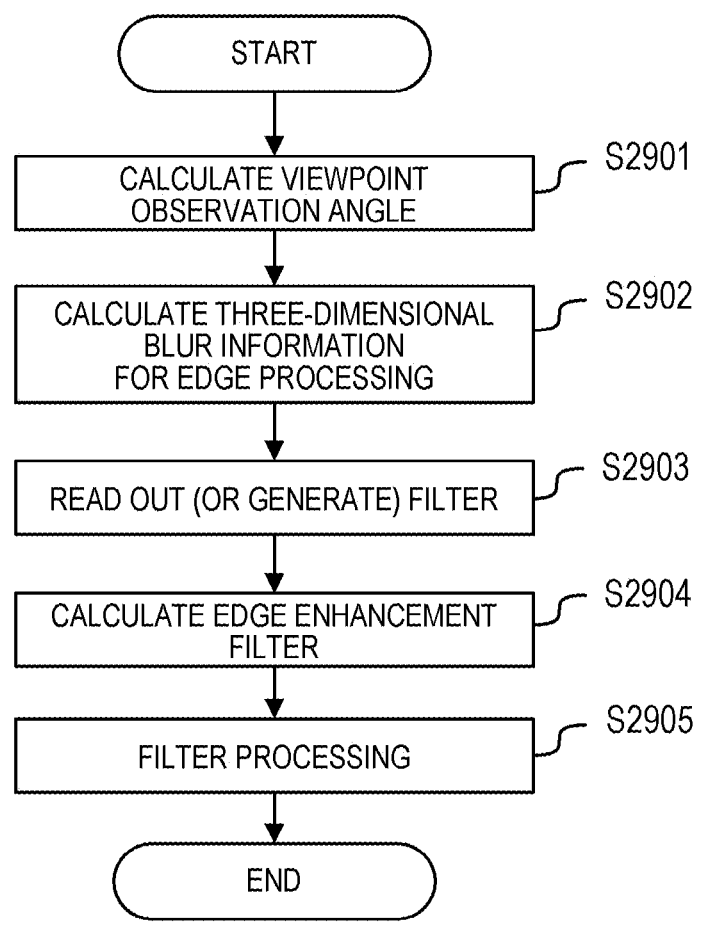
FIG. 29 is a flow chart showing internal processing of the viewpoint edge extraction processing S903 according to Example 7.

In addition, the viewpoint-decomposed edge extraction/synthesis processing S802 according to the present example can also adopt the configuration shown in FIG. 9. Internal processing of the viewpoint edge extraction processing S903 in this case is shown in FIG. 29.

Since a viewpoint observation angle calculating step S2901 and a three-dimensional blur-for-edge processing information calculating step S2902 are respectively the same processing as S2801 and S2802, a description thereof will be omitted.

Next, in a filter reading (generating) step S2903, in addition to $c'_{s,t}(u, v)$, $c_{s,t}(u, v)$ that is a Fourier transform of an integral image of the three-dimensional blur of an image pickup system in the line-of-sight direction is also acquired. In S2903, in a similar manner to S2803 shown in FIG. 28, data calculated in advance may be read from the storage device 130 or the main memory 303 or $c'_{s,t}(u, v)$ and $c_{s,t}(u, v)$ may be obtained by calculation.

Subsequently, in an edge enhancement filter calculating step S2904, using $c_{s,t}(u, v)$ and $c'_{s,t}(u, v)$ acquired in S2903, an edge enhancement filter $E_{s,t}(u, v)$ is calculated according to Expression 29.

In a filter processing step S2905, $A_{s,t}(u, v)$ is obtained by performing a Fourier transform on the viewpoint image $a_{s,t}(X, Y)$ calculated in advance in step S902, and $A'_{s,t}(u, v)$ is obtained by applying the edge enhancement filter $E_{s,t}(u, v)$ according to Expression 28. Finally, by subjecting $A'_{s,t}(u, v)$ to an inverse Fourier transform, $a'_{s,t}(X, Y)$ that is a viewpoint edge enhanced image is obtained.

It should be noted that the configuration according to the present example is also applicable to edge extraction in a similar manner to Example 6. By setting direct current components of the frequency filter $c'_{s,t}(u, v)$ which is read out in S2803 and the edge enhancement filter $E_{s,t}(u, v)$ which is calculated in S2904 to zero, a direct current component of $A'_{s,t}(u, v)$ also becomes zero. Since $a'_{s,t}(X, Y)$ that is an inverse Fourier transform thereof is equivalent to an image resulting from subtracting an image average value from each pixel, $a'_{s,t}(X, Y)$ may be considered an edge extracted image.

(Advantages of Present Example)

As described above, according to the present example, a similar effect as Example 6 can be achieved. In addition, since a filter stored in the image generating apparatus 100 can be utilized in order to calculate a viewpoint image from a Z stack image having various blurs at high speed, there is an additional advantage that no calculation load is required (there is a smaller calculation load) to newly generate a filter. A further advantage is that additional storage capacity for storing the new filter is not required.

EXAMPLE 8

While the generation of a viewpoint edge synthesized image based on the method according to Non-Patent Literature 2 has been described in Example 7, in Example 8, a configuration will be described which significantly reduces calculation load compared to Example 7 by generating a viewpoint edge synthesized image based on the method according to Non-Patent Literature 3.

Figure 30:
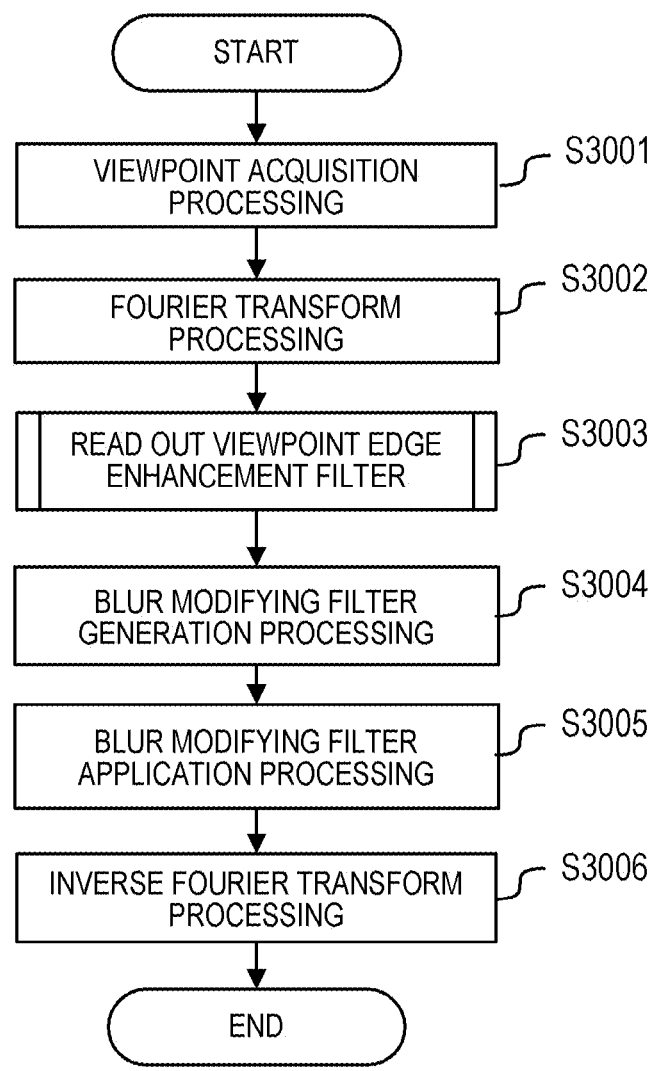
FIG. 30 is a flow chart showing the viewpoint—decomposed edge extraction/synthesis processing S802 according to Example 8.

FIG. 30 is a flow chart showing internal processing of the viewpoint-decomposed edge extraction/synthesis processing S802 according to Example 8.

First, in a viewpoint acquisition processing step S3001, positional information of a viewpoint necessary for the generation of a viewpoint edge synthesized image that is generated in step S802 is acquired. Since the processing is approximately similar to that of step S901, a description thereof will be omitted.

Next, in a Fourier transform processing step S3002, a two-dimensional Fourier transform is executed with respect to each layer image of the Z stack image acquired in step S801 to generate Fourier transformed layer images. This processing is represented by a mathematical expression as follows.

$$G^{(n)}=(u,v)=F\{g^{(n)}(X,Y)\} \quad \text{[Expression 31]}$$

where n denotes a number indicating an n-th layer image of the Z stack image, F{ } denotes a function representing a two-dimensional Fourier transform, and $g^{(n)}(X, Y)$ denotes an n-th layer image of the Z stack image.

Subsequently, in a viewpoint edge enhancement filter readout processing step S3003, a viewpoint edge enhancement filter $C'_{s,t}(u, v)$ is read out for each viewpoint position obtained in step S3001. Details will be given later.

Next, in a blur modifying filter generation processing step S3004, a three-dimensional blur modifying filter $H^{(n)}(u, v)$ is generated using the viewpoint edge enhancement filter read out in step S3003. This processing is represented by a mathematical expression as follows.

$$H^{(n)}(u,v)=\iint k_a(s,t)e^{-2\pi i(su+tv)n}C_{s,t}(u,v)^{-1}dsdt \quad \text{[Expression 32]}$$

In Expression 32, $k_a(s, t)$ denotes a function representing a weight of a light beam passing through a viewpoint (s, t) which constitutes a desired three-dimensional out-of-focus blur $h_a(X, Y, Z)$, whereby the following relationship holds true.

$$h_a(X,Y,Z)=\iint k_a(s,t)\delta(X+sZ,Y+tZ)dsdt \quad \text{[Expression 33]}$$

In a blur modifying filter application processing step S3005, the following arithmetic operation is performed between the Fourier transform $g^{(n)}(X, Y)$ of each layer image of the Z stack image obtained in step 3002 and the three-dimensional blur modifying filter $H^{(n)}(u, v)$ obtained in step S3004. Accordingly, a Fourier transformed image A' (u, v) of an edge-enhanced viewpoint edge synthesized image is obtained.

$$A'(u, v) = \sum_{n=0}^{N-1} H^{(n-n_f)}(u, v) G^{(n)}(u, v)$$ [Expression 34]

where A' (u, v) represents a Fourier transformed image of a viewpoint edge synthesized image at an nf-th (a Z direction coordinate of Z=Zf) image of the Z stack image. Moreover, Expression 34 may be calculated after obtaining $H^{(n-nf)}$ (u, v) using Expression 32.

Finally, in an inverse Fourier transform processing step S3006, an inverse Fourier transform is performed on the Fourier transform A' (u, v) of the viewpoint edge synthesized image obtained in step S3005 to obtain a viewpoint edge synthesized image a' (X, Y) to which edge enhancement processing has been applied.

Next, step S3003 will be described.

Figure 31:
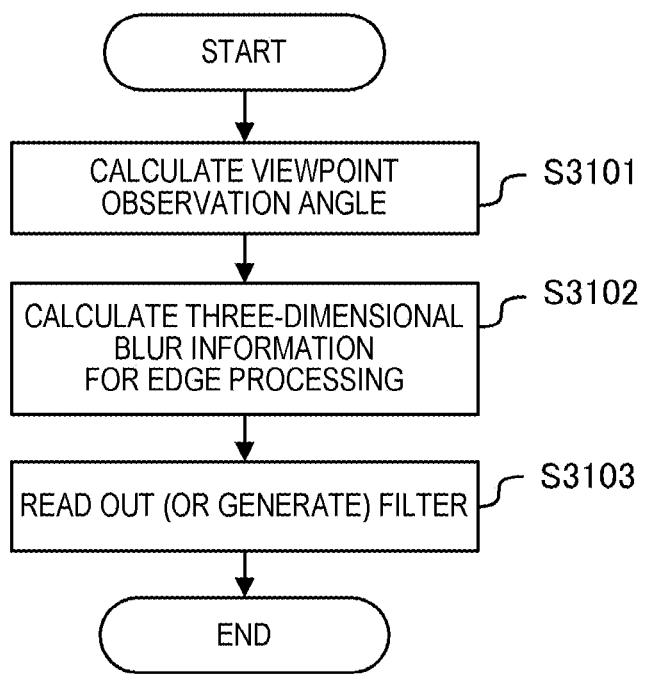
FIG. 31 is a flow chart showing internal processing of step S3003 shown in FIG. 30.

FIG. 31 is a flow chart showing internal processing of the viewpoint edge enhancement filter readout processing step S3003.

First, in a viewpoint observation angle calculating step S3101, in a similar manner to step S2801, an observation angle φ is calculated using a viewpoint (s, t), a sensor pixel pitch (an image sampling pitch) ΔX in the X direction, and a movement interval (a layer image interval) ΔZ in the Z direction according to Expression 5. Since a description has already been given with reference to step S2801, details will be omitted.

Next, in a three-dimensional blur-for-edge processing information calculating step S3012, in a similar manner to step S2802, information $(r_{b2})$ on a three-dimensional blur for edge processing is obtained using information $(r_{b1})$ on a three-dimensional blur of a photographed image and the observation angle φ calculated in S3101.

Subsequently, in a filter reading (generating) step S3103, in a similar manner to step S2803, $C'_{s,t}$ (u, v) is acquired from the storage device 130 or the main memory 303 based on the information $(r_{b2})$ calculated in step S3102. In a similar manner to step S2803, $C'_{s,t}$ (u, v)$^{-1}$ may be stored in advance and read out from the storage device 130 or the main memory 303. In this case, the speed of the calculation of Expression 32 in step S3004 can be increased. Since a description has already been given with reference to step S2803, details will be omitted.

(Advantages of Present Example)

As described above, according to the present example, a similar effect as Example 7 can be achieved. In addition, compared to Example 7, the present example is capable of significantly reducing the calculation load of a viewpoint edge synthesized image by using the MFI arbitrary viewpoint/out-of-focus blur image generating method described in Non-Patent Literature 3 and 4. Therefore, a desired viewpoint edge synthesized image can be generated at high speed in response to an instruction from the user and convenience of the edge extracting (or enhancing) function can be further improved.

While preferable embodiments of the present invention have been described above by providing a plurality of examples, configurations of the present invention are not limited to these examples.

For example, while a case in which a Z stack image photographed with a bright-field microscope is used as an original image has been described in the examples above, the present invention is also applicable to images photographed with an epi-illumination microscope, a light field camera, a light field microscope, and the like.

A light field camera and a light field microscope are apparatuses capable of acquiring, in one shot, an image on which is recorded four-dimensional information (information in which a degree of freedom of a viewpoint position is added to an XY two-dimensional image) that is referred to as a light field. In such apparatuses, a lens array is disposed at an original position of an imaging plane and a light field is photographed by an image sensor to the rear of the lens array. An image with an arbitrary focusing position or a viewpoint image observed from an arbitrary direction can also be generated using known techniques from an original image on which a light field is recorded. Therefore, the present invention can also be favorably applied to an original image acquired with a light field camera or a light field microscope.

In addition, while a pathological sample has been described in the examples above as an example of a subject, subjects are not limited to pathological samples. The subject may be a reflective object such as metal that is an observation object of an epi-illumination microscope. The subject may also be a transparent biological specimen that is an observation object of a transmissive observation microscope. Alternatively, the subject may be a landscape or a person that is a photographic object of a digital camera. In any case, by using the technique disclosed in Patent Literature 1 and the like, an arbitrary viewpoint image can be generated from a group of a plurality of images photographed while varying focusing positions of the subject and the present invention can be applied.

Furthermore, configurations described in the respective examples may be combined with each other. For example, the viewpoint acquisition processing (S901) according to Examples 1 and 2 may be replaced with the viewpoint determination processing (S1501). In this case, instead of being determined from settings configured in the viewpoint decomposition setting (704) or the like, a viewpoint is automatically determined by analyzing a Z stack image.

In addition, in Examples 3 and 4, when a region is large, the region may be further divided into small blocks and a direction of a calculated viewpoint may be varied for each block. As a result, even when a cell membrane or a cell boundary is curved or when there is a large number of nuclei, the accuracy of edge extraction can be improved.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-268173, filed on Dec. 7, 2012, Japanese Patent Application No. 2013-188641, filed on Sep. 11, 2013, Japanese Patent Application No. 2013-167437, filed on Aug. 12, 2013, and Japanese Patent Application No. 2013-204636, filed on Sep. 30, 2013, which are hereby incorporated by reference herein in their entirety.

The invention claimed is:

1. An image generating apparatus which generates an edge image that is an image for which an edge has been enhanced or extracted from an original image obtained by imaging a subject,
the image generating apparatus comprising:
a viewpoint image generating unit configured to generate a plurality of viewpoint images from the original image;
an edge processing unit configured to generate a plurality of edge images by applying a plurality of filters to the plurality of viewpoint images generated by the viewpoint image generating unit; and
an image synthesizing unit configured to generate an synthesized edge image by synthesizing the plurality of edge images generated by the edge processing unit,
wherein the plurality of viewpoint images includes a first viewpoint image and a second viewpoint image which has a different line-of-sight direction from the first viewpoint image, and
wherein the edge processing unit generates a first edge image by applying a first filter to the first viewpoint image, and generates a second edge image by applying a second filter different from the first filter to the second viewpoint image.

2. The image generating apparatus according to claim 1, wherein
the edge processing is processing having a feature in that a result of compositing a plurality of images and subsequently performing the edge processing on the composite image and a result of performing the edge processing on each of the plurality of images and subsequently compositing the edge images are not consistent with each other.

3. The image generating apparatus according to claim 1, wherein
the edge processing unit modifies a parameter of the filter so that an edge in a direction perpendicular to the line-of-sight direction is enhanced or extracted.

4. The image generating apparatus according to claim 1, wherein
the edge processing unit modifies a coefficient of the filter applied to the viewpoint image in accordance with the line-of-sight direction of the viewpoint image.

5. The image generating apparatus according to claim 1, wherein
the edge processing unit modifies a parameter of the filter so that the larger an angle formed between a depth direction of the subject and the line-of-sight direction, the wider a spatial frequency range in which enhancement or extraction of an edge is performed spreads toward a low-frequency side.

6. The image generating apparatus according to claim 1, wherein
the edge processing includes processing for suppressing high-frequency noise contained in an edge image, and
the edge processing unit modifies a parameter of the filter so that the larger an angle formed between a depth direction of the subject and the line-of-sight direction, the greater an effect of high-frequency noise suppression.

7. The image generating apparatus according to claim 1, further comprising
a viewpoint determining unit configured to estimate a direction of an edge included in the original image by analyzing the original image, and to determine a viewpoint at which a viewpoint image is to be generated based on the estimated edge direction.

8. The image generating apparatus according to claim 7, wherein
the viewpoint determining unit determines the viewpoint at which a viewpoint image is to be generated so that the estimated edge direction and a line-of-sight direction are perpendicular to each other.

9. The image generating apparatus according to claim 7, wherein
the viewpoint determining unit detects an edge from the original image and obtains a direction of the edge from a detection result thereof.

10. The image generating apparatus according to claim 7, wherein
the subject is a cell, and
the viewpoint determining unit detects a position of a nucleus of the cell from the original image and, based on a positional relationship between two adjacent nuclei, obtains a direction of an edge of a cell boundary that passes between the two nuclei.

11. The image generating apparatus according to claim 1, wherein
the image synthesizing unit composites the plurality of edge images by weighting the edge images, and
an edge image generated from a viewpoint image having a larger angle formed between a depth direction of the subject and a line-of-sight direction is given a smaller weight.

12. The image generating apparatus according to claim 11, wherein
the edge processing unit generates each edge image so that the larger an angle formed between a depth direction of the subject and a line-of-sight direction of a viewpoint image, the greater the degree of edge enhancement or edge extraction.

13. The image generating apparatus according to claim 1, wherein
the original image is a Z stack image constituted by a plurality of layer images obtained by imaging the subject while varying focusing positions in a depth direction.

14. The image generating apparatus according to claim 1, wherein
the original image is an image on which a light field is recorded.

15. An image generating method of generating an edge image that is an image for which an edge has been enhanced or extracted from an original image obtained by imaging a subject,
the image generating method comprising the steps, executed by a computer, of:

generating a plurality of viewpoint image from the original image;
generating a plurality of edge images by applying a plurality of filters to the plurality of viewpoint images; and
generating a synthesized edge image by synthesizing the plurality of edge images,
wherein the plurality of viewpoint images includes a first viewpoint image and a second viewpoint image which has a different line-of-sight direction from the first viewpoint image, and
wherein a first edge image is generated by applying a first filter to the first viewpoint image, and a second edge image is generated by applying a second filter different from the first filter to the second viewpoint image.

16. A non-transitory computer readable storing medium storing a program that causes a computer to execute the respective steps of the image generating method according to claim 15.

* * * * *